United States Patent
Watanabe et al.

(10) Patent No.: US 11,921,509 B2
(45) Date of Patent: Mar. 5, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Sayaka Watanabe, Tokyo (JP); Jianing Wu, Tokyo (JP); Jingjing Guo, Tokyo (JP); Natsuko Ozaki, Kanagawa (JP); Jun Yokono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 371 days.

(21) Appl. No.: 17/288,243

(22) PCT Filed: Oct. 2, 2019

(86) PCT No.: PCT/JP2019/038867
§ 371 (c)(1),
(2) Date: Apr. 23, 2021

(87) PCT Pub. No.: WO2020/090332
PCT Pub. Date: May 7, 2020

(65) Prior Publication Data
US 2021/0389767 A1    Dec. 16, 2021

(30) Foreign Application Priority Data

Oct. 30, 2018 (JP) .................. 2018-203412

(51) Int. Cl.
G05D 1/02    (2020.01)
G01C 21/00    (2006.01)
G05D 1/00    (2006.01)

(52) U.S. Cl.
CPC ....... *G05D 1/0212* (2013.01); *G01C 21/3885* (2020.08); *G05D 1/0088* (2013.01); *G05D 1/0231* (2013.01); *G05D 2201/0214* (2013.01)

(58) Field of Classification Search
CPC .. G05D 1/0212; G05D 1/0088; G05D 1/0231; G05D 1/0291; G05D 2201/0214;
(Continued)

(56) References Cited

U.S. PATENT DOCUMENTS

| 11,091,211 B1 * | 8/2021 | Ebrahimi Afrouzi .. B62D 24/00 |
| 2002/0103576 A1 * | 8/2002 | Takamura ................ B25J 9/163 |
| | | 700/245 |

(Continued)

FOREIGN PATENT DOCUMENTS

| WO | WO 99/067067 A1 | 12/1999 |
| WO | WO 00/067961 A1 | 11/2000 |
| WO | WO-2018012446 A1 * | 1/2018 .............. A63H 11/00 |

OTHER PUBLICATIONS

Fong et al.; A survey of socially interactive robots; Robotics and Autonomous Systems vol. 42 (2003) pp. 143-166 (Year: 2003).*

(Continued)

*Primary Examiner* — Michael J Zanelli
(74) *Attorney, Agent, or Firm* — Paratus Law Group, PLLC

(57) ABSTRACT

Provided is an information processing apparatus including: a motion control unit (107) that controls a motion of an autonomous moving body (10), in which, when transmitting/receiving internal data related to the autonomous moving body, the motion control unit causes the autonomous moving body to express execution of the transmission/reception of the internal data by an action.

20 Claims, 28 Drawing Sheets

(58) Field of Classification Search
CPC .............. G01C 21/3885; G01C 21/206; G01C 21/383; G06N 3/00
See application file for complete search history.

(56) References Cited

U.S. PATENT DOCUMENTS

| | | | |
|---|---|---|---|
| 2003/0060930 A1* | 3/2003 | Fujita | B25J 9/1602 700/245 |
| 2018/0178372 A1* | 6/2018 | Lee | G06V 20/10 |
| 2018/0361586 A1* | 12/2018 | Tan | B25J 9/1666 |

OTHER PUBLICATIONS

Fujita et al.; Development of an Autonomous Quadruped Robot for Robot Entertainment; Autonomous Robots, vol. 5, pp. 7-18 (1998) (Year: 1998).*

Li et al.; Communication of Emotion in Social Robots through Simple Head and Arm Movements; Int J Soc Robot (2011) vol. 3: pp. 125-142 (Year: 2011).*

* cited by examiner

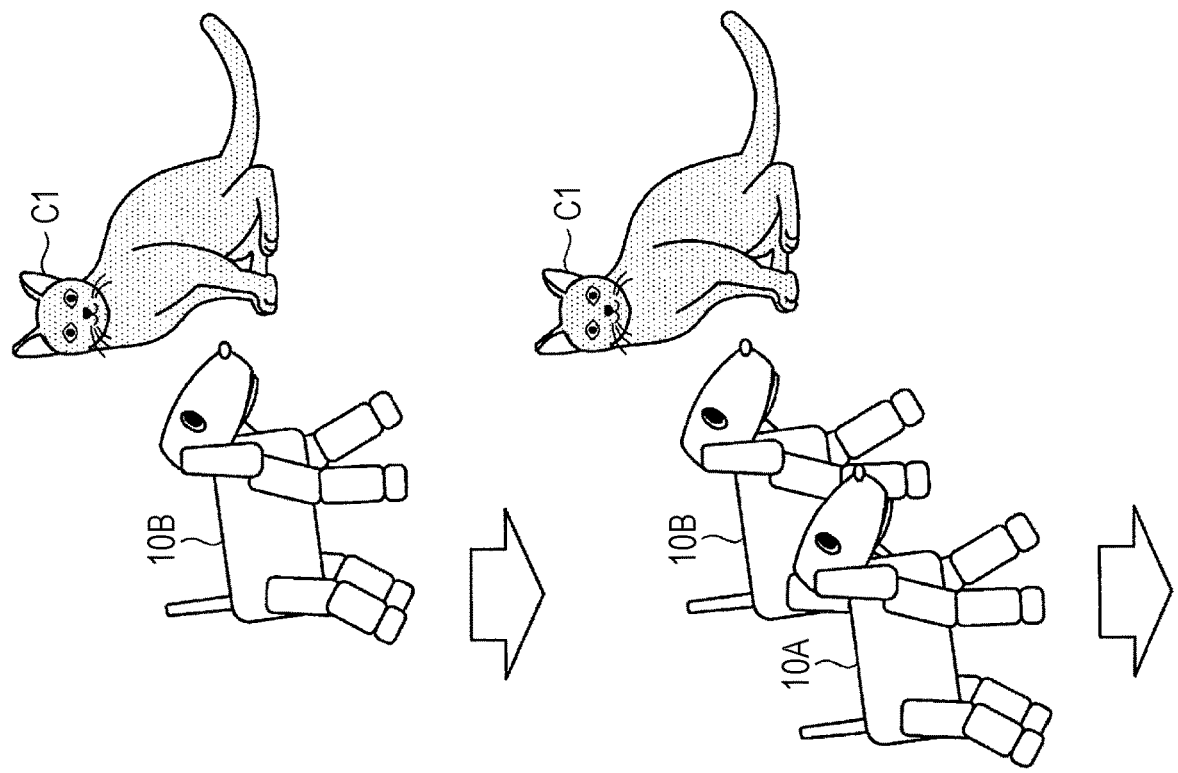
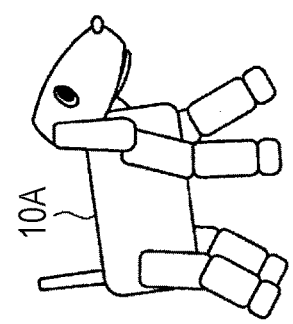
FIG. 10A

FIG. 17
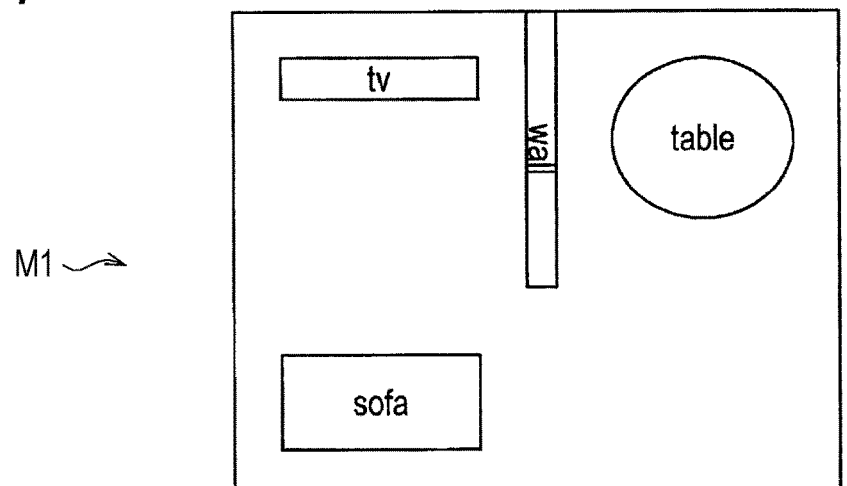
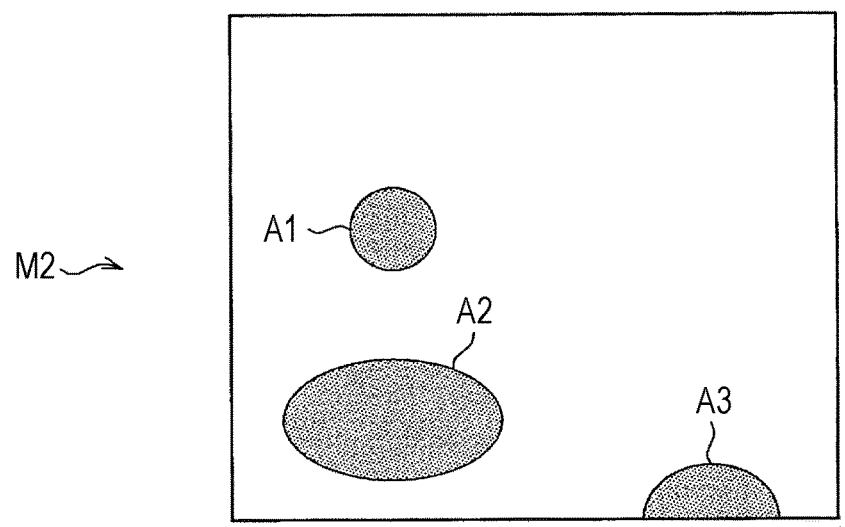
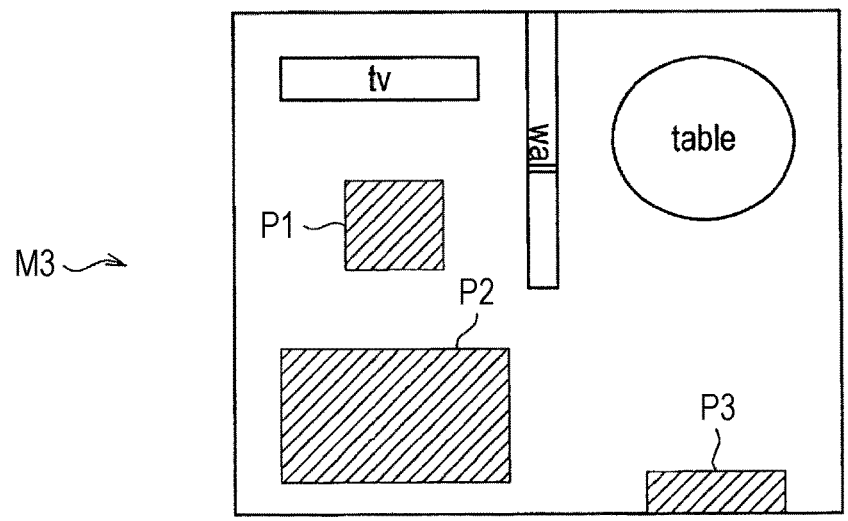

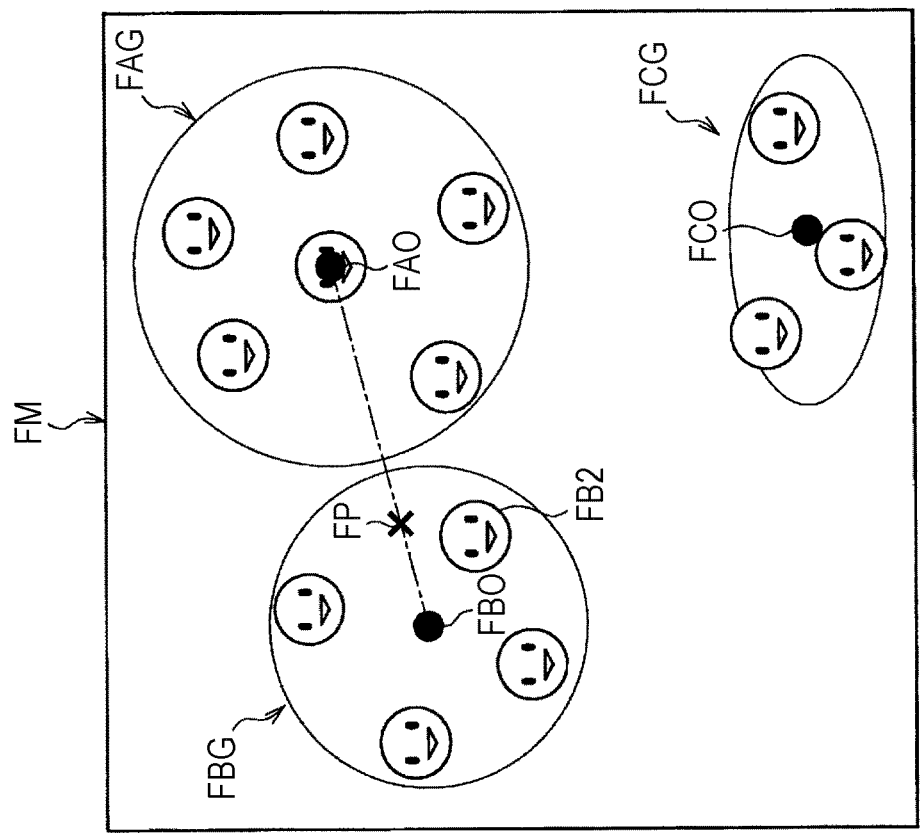
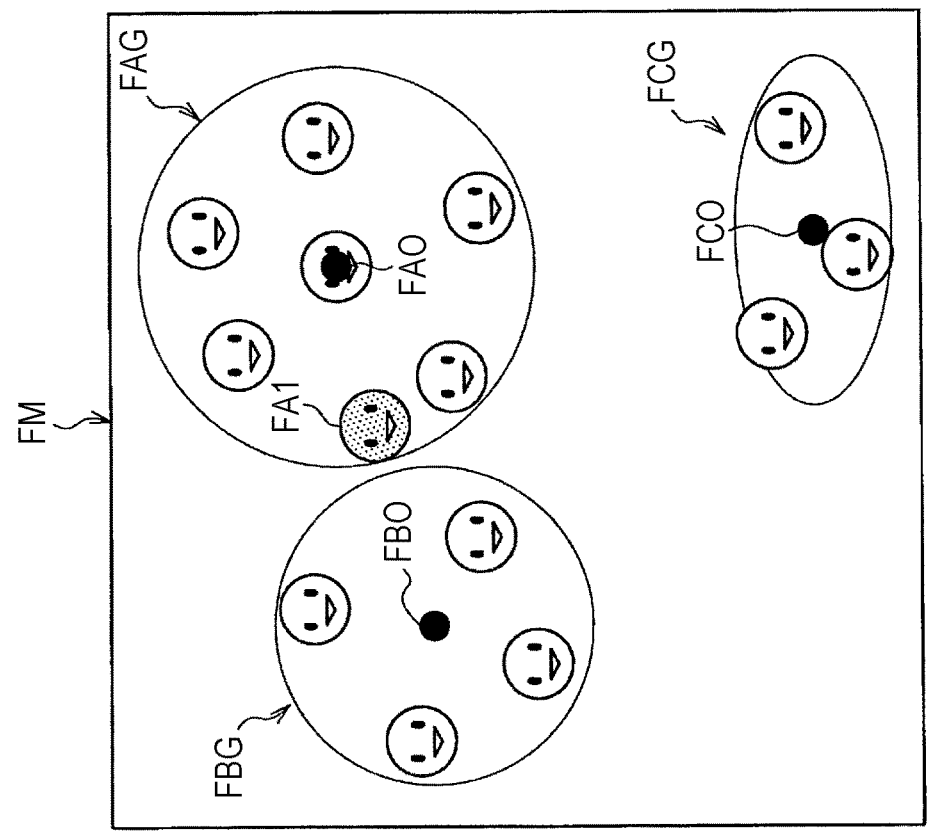
FIG. 21

FIG. 23
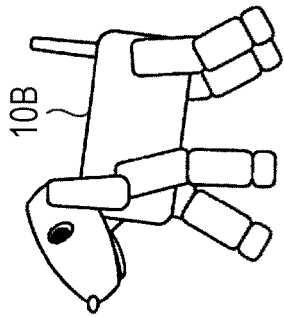
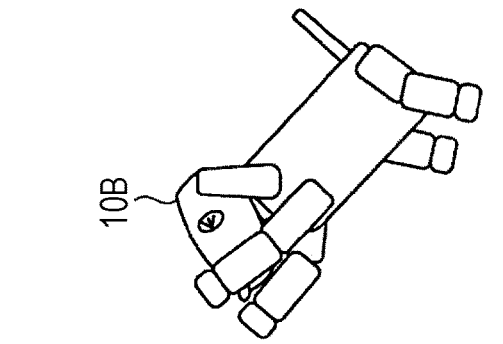
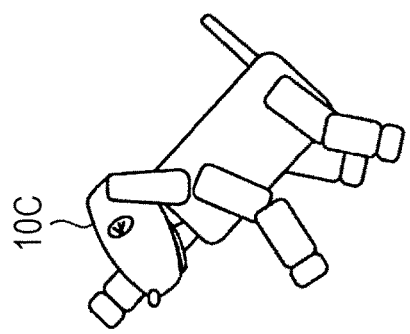
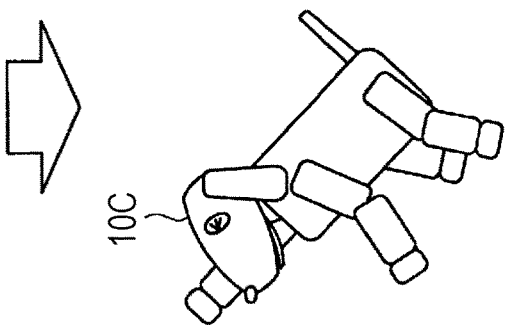
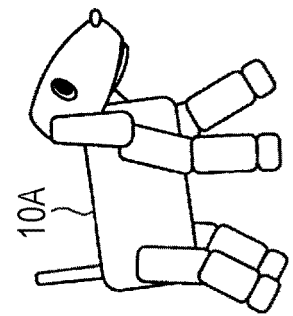
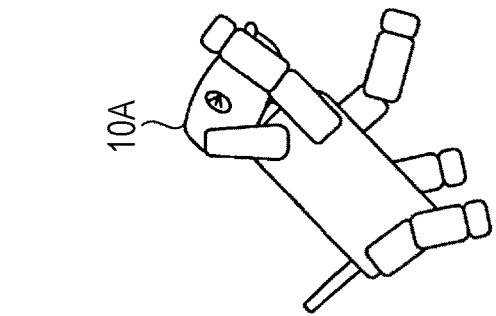

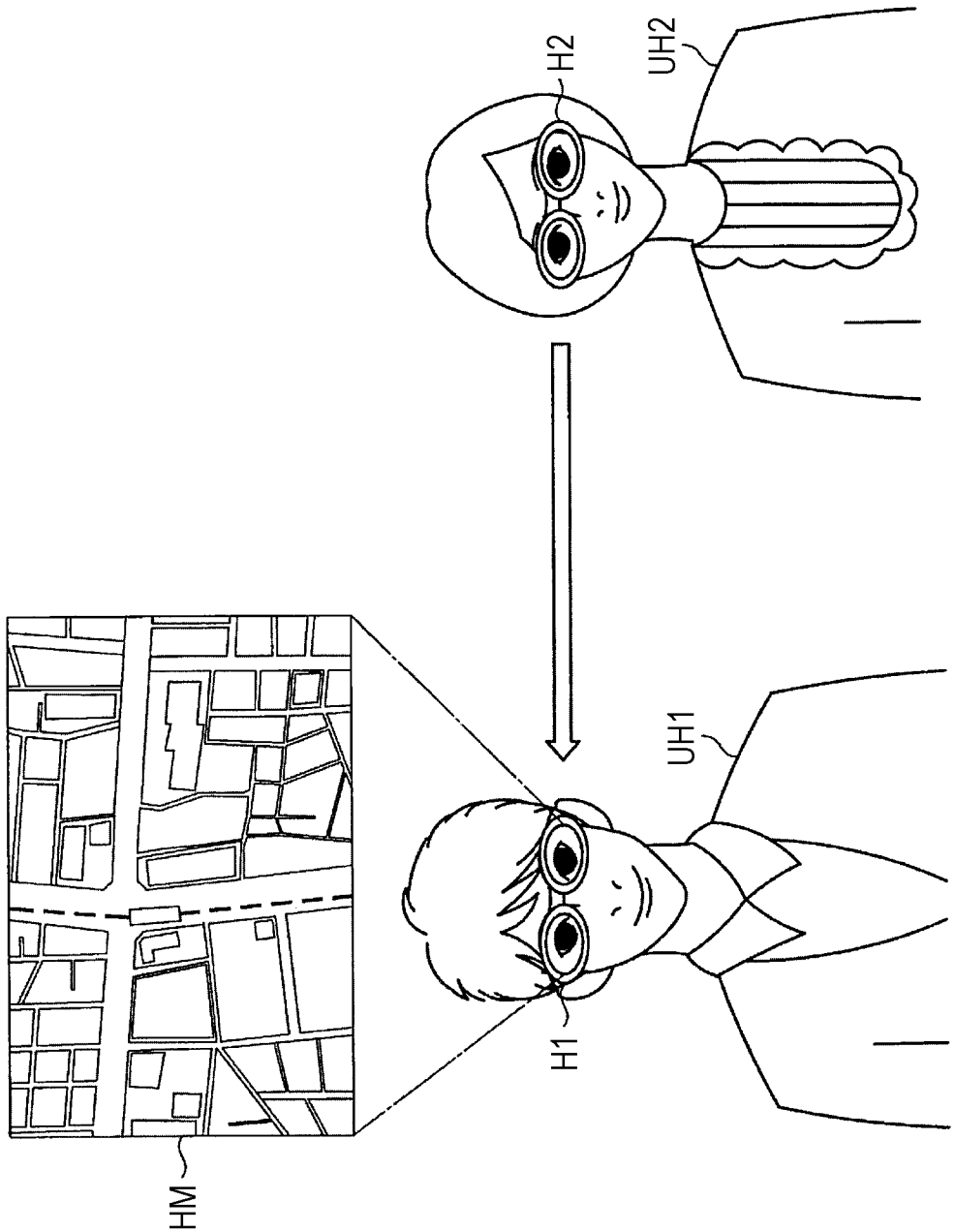

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/038867 (filed on Oct. 2, 2019) under 35 U.S.C. § 371, which claims priority to Japanese Patent Application No. 2018-203412 (filed on Oct. 30, 2018), which are all hereby incorporated by reference in their entirety.

TECHNICAL FIELD

The present disclosure relates to an information processing apparatus, an information processing method, and a program.

BACKGROUND ART

In recent years, a variety of devices having a recognition function have been developed. The above-described devices include an autonomous moving body such as a robot that performs an autonomous motion on the basis of a situation. Moreover, many techniques for changing actions which an autonomous moving body can take have been proposed. For example, Patent Document 1 describes a device that changes such possible actions on the basis of an action history or input from a user.

CITATION LIST

Patent Document

Patent Document 1: International Publication No. 00/67961

SUMMARY OF THE INVENTION

Problems to be Solved by the Invention

However, in the invention described in Patent Document 1, the actions which the autonomous moving body can take are limited to predetermined actions. Moreover, in a case where the actions which the autonomous moving body can take change, the user does not always notice the change in the actions.

Solutions to Problems

According to the present disclosure, provided is an information processing apparatus including: a motion control unit that controls a motion of an autonomous moving body, in which, when transmitting/receiving internal data related to the autonomous moving body, the motion control unit causes the autonomous moving body to express execution of the transmission/reception of the internal data by an action.

Moreover, according to the present disclosure, provided is an information processing method including: causing a processor to control a motion of an autonomous moving body; and causing the processor to, when transmitting/receiving internal data related to the autonomous moving body, cause the autonomous moving body to express execution of the transmission/reception of the internal data by an action.

Furthermore, according to the present disclosure, provided is a program for causing a computer to function as an information processing apparatus including: a motion control unit that controls a motion of an autonomous moving body, in which, when transmitting/receiving internal data related to the autonomous moving body, the motion control unit causes the autonomous moving body to express execution of the transmission/reception of the internal data by an action.

BRIEF DESCRIPTION OF DRAWINGS

FIG. 10A is a diagram for explaining an example of expressing, by an action, execution of transmission/reception of information related to recognition processing by a motion control unit 107 according to the same embodiment.

FIG. 17 is a diagram for explaining an example of an environment map and an attention level map, which are transmitted and received by the autonomous moving body 10 according to the same embodiment.

FIG. 21 is a diagram for explaining clustering of feature quantities in user recognition according to the same embodiment and mutation of the feature quantities by a data mutation unit 106.

FIG. 23 is a diagram for explaining an example of transmission/reception of information for executing motions of the autonomous moving bodies 10 according to the same embodiment and expression of the transmission/reception by the autonomous moving body 10.

FIG. 28 is a diagram for explaining that a head-mounted display expresses execution of transmission/reception of internal data.

MODE FOR CARRYING OUT THE INVENTION

Figure 1:
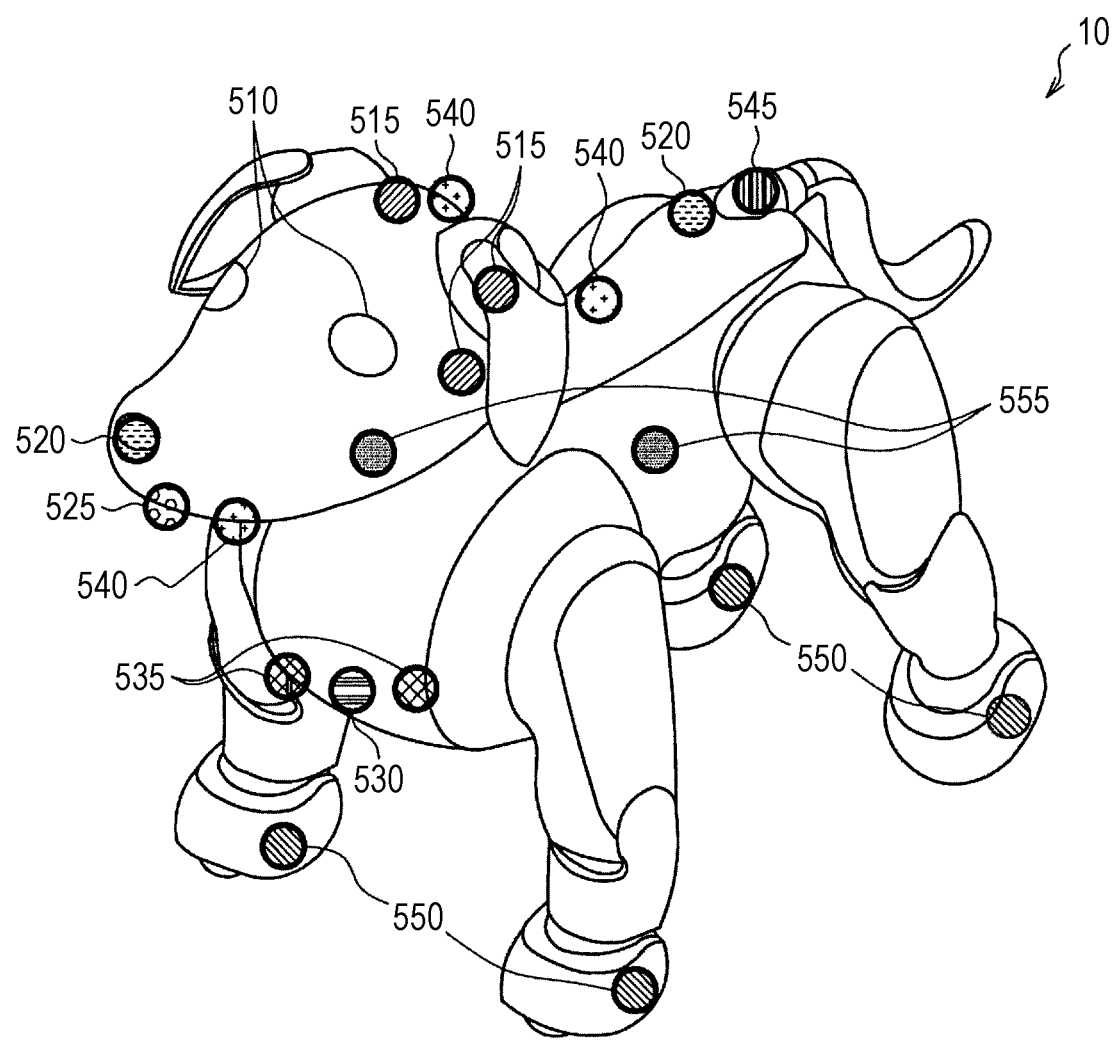
FIG. 1 is a diagram showing a hardware configuration example of an autonomous moving body 10 according to an embodiment of the present disclosure.

Preferred embodiments of the present disclosure will be described in detail below with reference to the accompanying drawings. Note that, in the present description and the drawings, constituent elements having substantially the same functional configuration are denoted by the same reference numerals, whereby a duplicate description thereof will be omitted.

Note that the embodiments will be described in the following order.

1. Embodiment
1.1. Overview of autonomous moving body 10
1.2. Hardware configuration example of autonomous moving body 10
1.3. Functional configuration example of autonomous moving body 10
1.4. Specific example
2. Summary 1. First Embodiment <<1.1. Overview of Autonomous Moving Body 10>>

First, an overview of an autonomous moving body 10 according to an embodiment of the present disclosure will be described. The autonomous moving body 10 according to the embodiment of the present disclosure is an information processing apparatus that executes estimation of a situation, which is based on collected sensor information, and autonomously selects and executes a variety of actions corresponding to the situation. One of features of the autonomous moving body 10 is that, unlike a robot that simply performs a motion according to a user's instruction command, the autonomous moving body 10 autonomously executes an action presumed to be optimal for every situation.

Note that the autonomous moving body 10 according to the embodiment of the present disclosure may be a dog-type information processing apparatus. One of the features of the autonomous moving body 10 according to the embodiment of the present disclosure is that the autonomous moving body 10 does not have output means of visual information other than an emotional expression by eye movement or language transmission means by voice. According to this feature, it is made possible to achieve a more natural motion close to that of an actual dog, and to reduce user's discomfort to functions and exterior which the autonomous moving body 10 has.

The autonomous moving body 10 according to the embodiment of the present disclosure can execute a predetermined action on the basis of internal data. Here, the internal data refers to, for example, information related to recognition processing and information for causing the autonomous moving body 10 to execute a motion (this information will also be referred to as control sequence data). Moreover, the internal data includes information for executing an action corresponding to information related to recognition of a recognition target. Furthermore, the action executed by the autonomous moving body 10 includes a motion of the autonomous moving body 10 itself, an action including the recognition processing, and the like.

Here, the above-described control sequence data (information for causing the autonomous moving body 10 to execute a motion) is information including control signals related to a time-series change in a rotation position of a joint portion which the autonomous moving body 10 has, an eyeball expression and sound output thereof. That is, the control sequence data can also be said to be setting data for causing the autonomous moving body 10 to achieve an arbitrary action.

The autonomous moving body 10 executes the recognition processing, the motion, and the like, and is thereby capable of changing a type of the internal data stored in that autonomous moving body 10. For example, the autonomous moving body 10 autonomously learns an object encountered for the first time, and becomes able to recognize the object.

Incidentally, in a case of an apparatus that does not have explicit information transmission means to the user, it may be difficult for the user to clearly grasp a state of the apparatus. For example, the autonomous moving body 10 has a function to execute an action based on a variety of internal data. However, unlike a display function mounted in a smartphone and the like, it is difficult for the user to determine whether or not the autonomous moving body 10 has the internal data until the action based on the internal data is expressed.

Moreover, types of the internal data which can be acquired by each autonomous moving body 10 may have a limit, for example, due to factors such as a limitation of an action range of the autonomous moving body 10. Hence, variations of the action corresponding to the acquisition are also limited. Moreover, depending on the recognition target, it may take time to learn the same. Furthermore, in a similar way, also with regard to such motions of the autonomous moving body 10, for example, a gesture and the like, there may be a limit to learning motions other than motions predetermined for the autonomous moving body 10.

The technical idea according to the present disclosure has been conceived by paying attention to the above-described points, in which the autonomous moving body 10 acquires more diverse internal data, thus enabling the user to enjoy the autonomous moving body 10 without causing the user to get tired. Moreover, the user grasps the execution of transmission/reception of the internal data by the autonomous moving body 10, thus making it possible to enjoy the change of the autonomous moving body 10 more in real time.

The configuration of the autonomous moving body 10 that achieves the above-described features will be described in detail below. Note that the autonomous moving body 10 according to the embodiment of the present disclosure may be an autonomous mobile robot that autonomously moves in space and executes various movements. The autonomous moving body 10 may be, for example, an autonomous mobile robot that has a shape imitating an animal such as a human and a dog and has a moving ability. Moreover, the autonomous moving body 10 may be, for example, a vehicle or other apparatus, which has an ability to communicate with the user. With regard to the autonomous moving body 10 according to the embodiment of the present disclosure, a shape thereof and levels of ability, desire and the like thereof can be appropriately designed according to the purpose and the role.

<<1.2. Hardware Configuration Example of Autonomous Moving Body 10>>

Next, a hardware configuration example of the autonomous moving body 10 according to the embodiment of the present disclosure will be described. Note that, in the following, a case where the autonomous moving body 10 is a dog-shaped quadruped walking robot will be described as an example.

FIG. 1 is a diagram showing a hardware configuration example of the autonomous moving body 10 according the embodiment of the present disclosure. As shown in FIG. 1, the autonomous moving body 10 is a dog-shaped quadruped walking robot having a head, a body, four legs, and a tail. Moreover, the autonomous moving body 10 includes two displays 510 on the head.

Furthermore, the autonomous moving body 10 includes a variety of sensors. The autonomous moving body 10 includes, for example, microphones 515, cameras 520, a time of flight (ToF) sensor 525, a human sensor 530, a distance measuring sensor 535, touch sensors 540, an illuminance sensor 545, sole buttons 550, and inertial sensors 555.

(Microphones 515)

The microphones 515 have a function to collect ambient sounds. The above-described sounds include, for example, user's utterances and ambient environmental sounds. The autonomous moving body 10 may be provided with, for example, four microphones on the head. The autonomous moving body 10 includes such a plurality of microphones 515, whereby it is made possible to collect, with high sensitivity, sounds generated in the surroundings, and to achieve localization of a sound source.

(Cameras 520)

The cameras 520 have a function to image the user and the ambient environment. The autonomous moving body 10 may be provided with, for example, two wide-angle cameras at the tip of the nose and the haunch. In this case, the wide-angle camera placed at the tip of the nose captures an image corresponding to a front field of view (that is, the dog's field of view) of the autonomous moving body, and the wide-angle camera at the haunch captures an image of a surrounding region centered on an upper side. For example, on the basis of the image captured by the wide-angle camera placed at the haunch, the autonomous moving body 10 extracts feature points on a ceiling, and the like, and can achieve Simultaneous Localization and Mapping (SLAM).

(ToF Sensor 525)

The ToF sensor 525 has a function to detect a distance to an object present in front of the head. The ToF sensor 525 is provided at the tip of the nose of the head. According to the ToF sensor 525, distances to a variety of objects can be detected with high accuracy, and it is made possible to achieve motions corresponding to relative positions with objects including the user, obstacles, and the like.

(Human Sensor 530)

The human sensor 530 has a function to sense the location of the user or of a pet kept by the user, for example. The human sensor 530 is placed, for example, on the chest. According to the human sensor 530, a moving object present in front is sensed, thus making it possible to achieve a variety of motions on the moving object, for example, motions corresponding to emotions such as interest, fear, and surprise.

(Distance Measuring Sensors 535)

The distance measuring sensors 535 have a function to acquire a situation of a front floor surface of the autonomous moving body 10. The distance measuring sensors 535 are placed, for example, on the chest. According to the distance measuring sensors 535, a distance to an object present on the front floor surface of the autonomous moving body 10 can be detected with high accuracy, and a motion corresponding to a relative position with the object can be achieved.

(Touch Sensors 540)

The touch sensors 540 have a function to sense a contact by the user. The touch sensors 540 are placed, for example, at regions where the user is likely to touch the autonomous moving body 10, such as the top of the head, under the chin, and the back. The touch sensors 540 may be, for example, touch sensors of an electrostatic capacitance type or pressure sensitive type. According to the touch sensors 540, a contact action such as touching, stroking, hitting and pushing by the user can be sensed, and it is made possible to perform a motion corresponding to the contact action.

(Illuminance Sensor 545)

The illuminance sensor 545 detects illuminance in a space where the autonomous moving body 10 is located. The illuminance sensor 545 may be placed, for example, at the base of the tail on the back surface of the head. According to the illuminance sensor 545, it is made possible to detect brightness of the surroundings and to execute a motion corresponding to the brightness.

(Sole Buttons 550)

The sole buttons 550 have a function to detect whether or not the bottom surfaces of the legs of the autonomous moving body 10 are in contact with the floor. For this purpose, the sole buttons 550 are individually placed at regions corresponding to the paw pads of four legs. According to the sole buttons 550, contact or non-contact between the autonomous moving body 10 and the floor surface can be detected, and it is made possible to grasp, for example, that the autonomous moving body 10 has been held up by the user.

(Inertial Sensors 555)

The inertial sensors 555 are 6-axis sensors each of which detects a physical quantity such as speed, acceleration, and rotation of the head or the body. That is, the inertial sensors 555 detect accelerations and angular velocities on the X-axis, the Y-axis, and the Z-axis. The inertial sensors 555 are individually placed on the head and the body. According to the inertial sensors 555, it is made possible to detect the movements of the head and body of the autonomous moving body 10 with high accuracy, and to achieve motion control corresponding to the situation.

The example of the sensors which the autonomous moving body 10 according to the embodiment of the present disclosure includes has been described above. Note that the above-described configurations described with reference to FIG. 1 are merely an example, and the configurations of the sensors which the autonomous moving body 10 can include are not limited to such an example. In addition to the above-described configurations, the autonomous moving body 10 may further include, for example, a temperature sensor, a geomagnetic sensor, an infrared sensor, and a variety of communication devices including a global navigation satellite system (GNSS) signal receiver. The configurations of the sensors which the autonomous moving body 10 includes can be flexibly modified according to specifications and operations.

Figure 2:
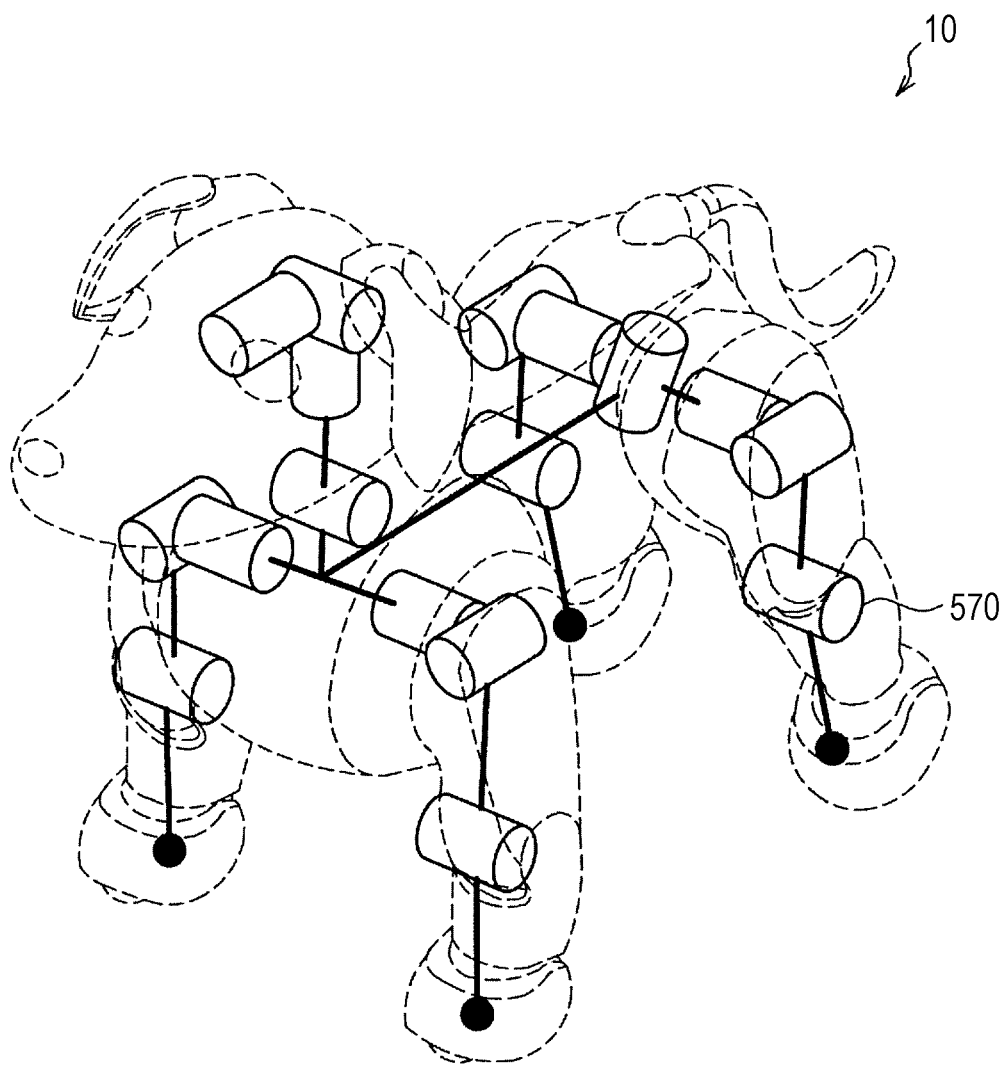
FIG. 2 is a diagram showing a configuration example of actuators 570 which the autonomous moving body 10 according to the embodiment of the present disclosure includes.

Subsequently, a configuration example of the joint portion of the autonomous moving body 10 according to the embodiment of the present disclosure will be described. FIG. 2 is a configuration example of actuators 570 which the autonomous moving body 10 according to the embodiment of the present disclosure includes. The autonomous moving body 10 according to the embodiment of the present disclosure has a total of 22 degrees of freedom of rotation, two at the ears and two at the tail and one at the mouth, in addition to rotation spots shown in FIG. 2.

For example, the autonomous moving body 10 has three degrees of freedom in the head, and can thereby achieve both of a nodding motion and a tilting motion simultaneously. Moreover, the autonomous moving body 10 reproduces a swing motion of the haunch by the actuators 570 provided in the haunch, and is thereby able to achieve a natural and flexible motion closer to that of a real dog.

Note that the autonomous moving body 10 according to the embodiment of the present disclosure may achieve the above-described 22 degrees of freedom of rotation by, for example, combining 1-axis actuators and 2-axis actuators with each other. For example, the 1-axis actuators may be adopted for the elbows and knees in the legs, and the 2-axis actuators may be adopted for the shoulders and the bases of the thighs.

Figure 3:
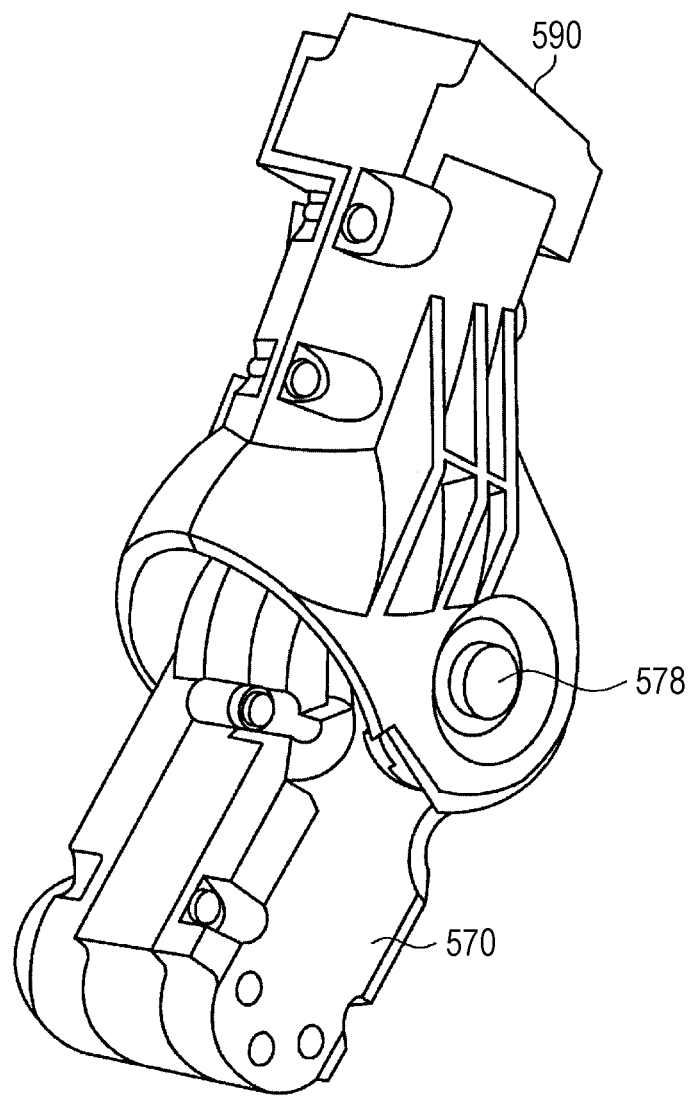
FIG. 3 is a diagram for explaining a motion of each of the actuators 570 which the autonomous moving body 10 according to the embodiment of the present disclosure includes.
Figure 4:
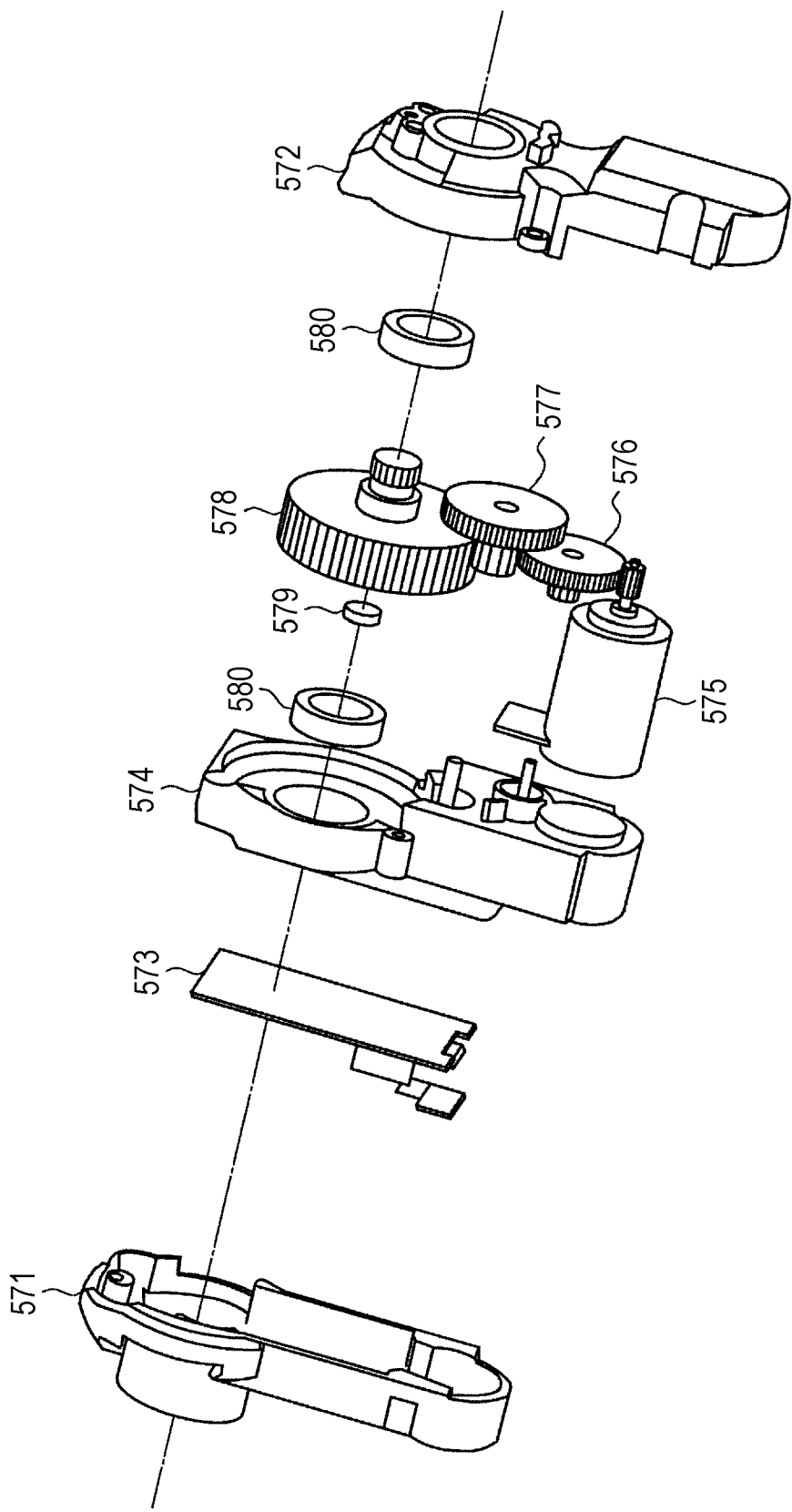
FIG. 4 is a diagram for explaining the motion of each of the actuators 570 which the autonomous moving body 10 according to the embodiment of the present disclosure includes.

FIGS. 3 and 4 are diagrams for explaining a motion of each of the actuators 570 which the autonomous moving body 10 according to the embodiment of the present disclosure includes. Referring to FIG. 3, the actuator 570 rotates an output gear by a motor 575, and can thereby drive a movable arm 590 at arbitrary rotation position and rotation speed.

Referring to FIG. 4, the actuator 570 according to the embodiment of the present disclosure includes a rear cover 571, a gear box cover 572, a control board 573, a gear box base 574, a motor 575, a first gear 576, a second gear 577, an output gear 578, a detection magnet 579, and two bearings 580.

The actuator 570 according to the embodiment of the present disclosure may be, for example, a magnetic spin-valve giant magnetoresistive (svGMR). The control board 573 rotates the motor 575 on the basis of control of a main processor, whereby power is transmitted to the output gear 578 via the first gear 576 and the second gear 577, thus making it possible to drive the movable arm 590.

Moreover, a position sensor provided on the control board 573 detects a rotation angle of the detection magnet 579 that rotates in synchronization with the output gear 578, thus making it possible to detect a rotation angle of the movable arm 590, that is, a rotation position thereof with high accuracy.

Note that, since the magnetic svGMR is of a non-contact type, the magnetic svGMR has excellent durability, and use thereof in a GMR saturation region leads to an advantage that an influence of signal fluctuations due to distance fluctuations of the detection magnet 579 and the position sensor is small.

The configuration example of the actuators 570 which the autonomous moving body 10 according to the embodiment of the present disclosure includes has been described above. According to the above-described configuration, it is made possible to accurately control bending and stretching motions of the joint portions which the autonomous moving body 10 includes, and to accurately detect the rotation positions of the joint portions.

Figure 5:
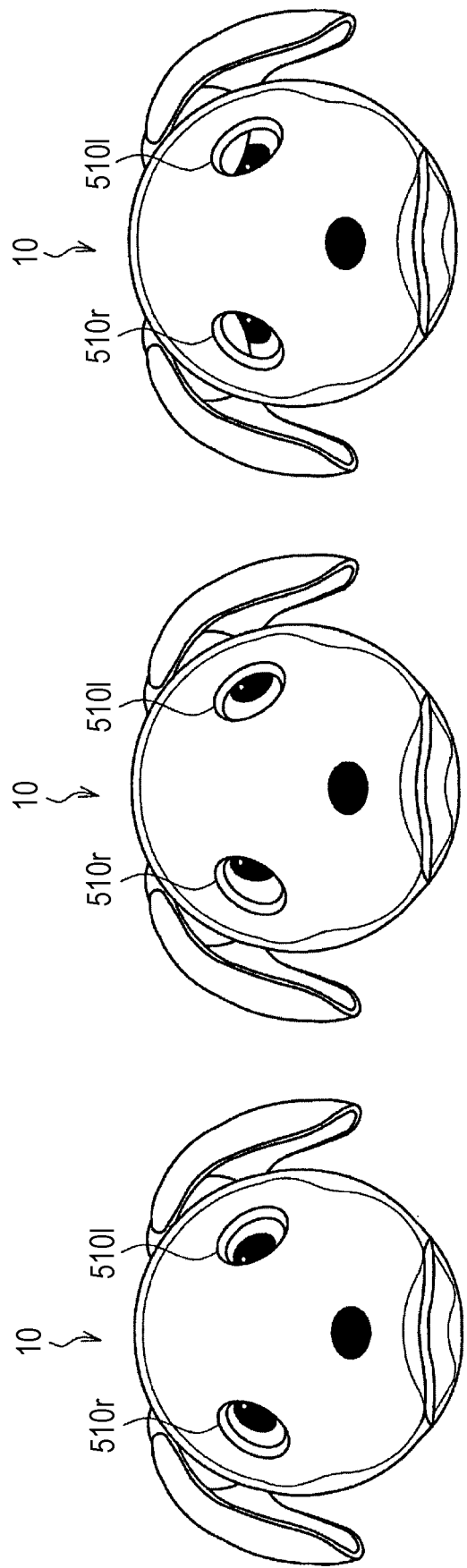
FIG. 5 is a diagram for explaining a function of displays 510 which the autonomous moving body 10 according to the embodiment of the present disclosure includes.

Subsequently, referring to FIG. 5, functions of the displays 510 which the autonomous moving body 10 according to the embodiment of the present disclosure includes will be described. FIG. 5 is a diagram for explaining the function of the displays 510 which the autonomous moving body 10 according to the embodiment of the present disclosure includes.

(Displays 510)

The displays 510 have a function to visually express eye movements and emotions of the autonomous moving body 10. As shown in FIG. 5, the displays 510 can express motions of the eyeballs, the pupils, and the eyelids, which correspond to the emotions and the motions. The displays 510 intentionally do not display characters, symbols, or images which are not related to the eye movements, thereby producing natural motions close to those of real animals such as dogs.

Moreover, as shown in FIG. 5, the autonomous moving body 10 includes two displays 510*r* and 510*l*, which correspond to the right eye and the left eye, respectively. The displays 510*r* and 510*l* are achieved by, for example, two independent organic light emitting diodes (OLEDs). According to the OLEDs, it is made possible to reproduce the curved surfaces of the eyeballs, and a more natural exterior can be achieved as compared to a case where a pair of eyeballs is expressed by one flat display, or a case where two eyeballs are individually expressed by two independent flat displays.

As described above, according to the displays 510r and 510l, it is made possible to express a line of sight of the autonomous moving body 10 and the emotions thereof, which are as shown in FIG. 5, with high accuracy and flexibility. Moreover, the user is enabled to intuitively grasp a state of the autonomous moving body 10 from the movements of the eyeballs displayed on the displays 510.

Figure 6:
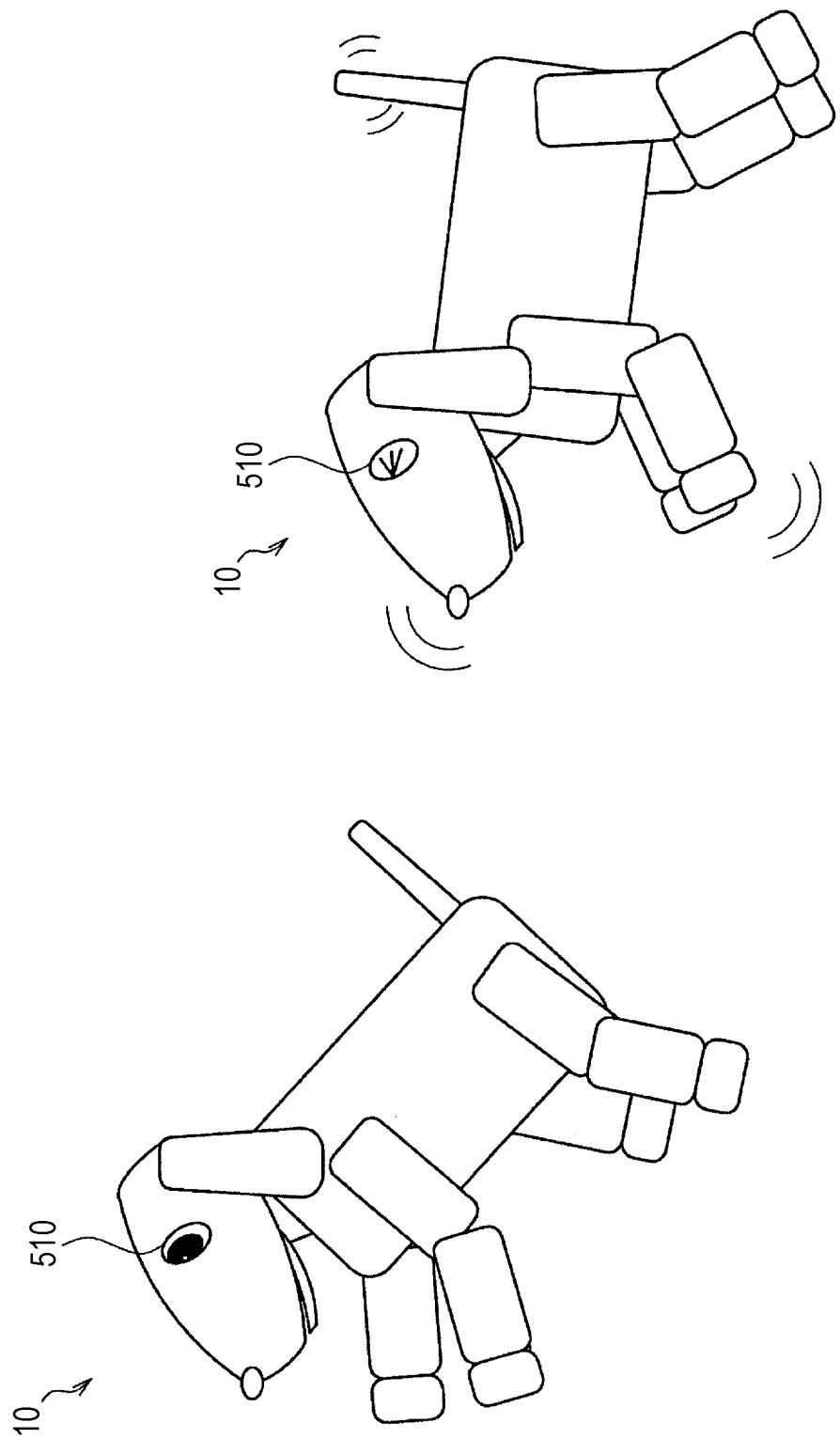
FIG. 6 is a diagram showing motion examples of the autonomous moving body 10 according to the embodiment of the present disclosure.

The hardware configuration example of the autonomous moving body 10 according to the embodiment of the present disclosure has been described above. According to the above-described configuration, as shown in FIG. 6, the motions of the joint portions and eyeballs of the autonomous moving body 10 are controlled with high accuracy and flexibility, whereby it is made possible to achieve motions and emotional expressions, which are closer to those of real creatures. Note that FIG. 6 is a diagram showing motion examples of the autonomous moving body 10 according to the embodiment of the present disclosure; however, in FIG. 6, an external structure of the autonomous moving body 10 is shown in a simplified manner in order to make the description while paying attention to the motions of the joint portions and eyeballs of the autonomous moving body 10. Likewise, in the following description, the external structure of the autonomous moving body 10 may sometimes be shown in a simplified manner; however, the hardware configuration and exterior of the autonomous moving body 10 according to the embodiment of the present disclosure are not limited to the example shown by the drawings, and can be designed as appropriate.

<<1.3. Functional Configuration Example of Autonomous Moving Body 10>>

Figure 7:
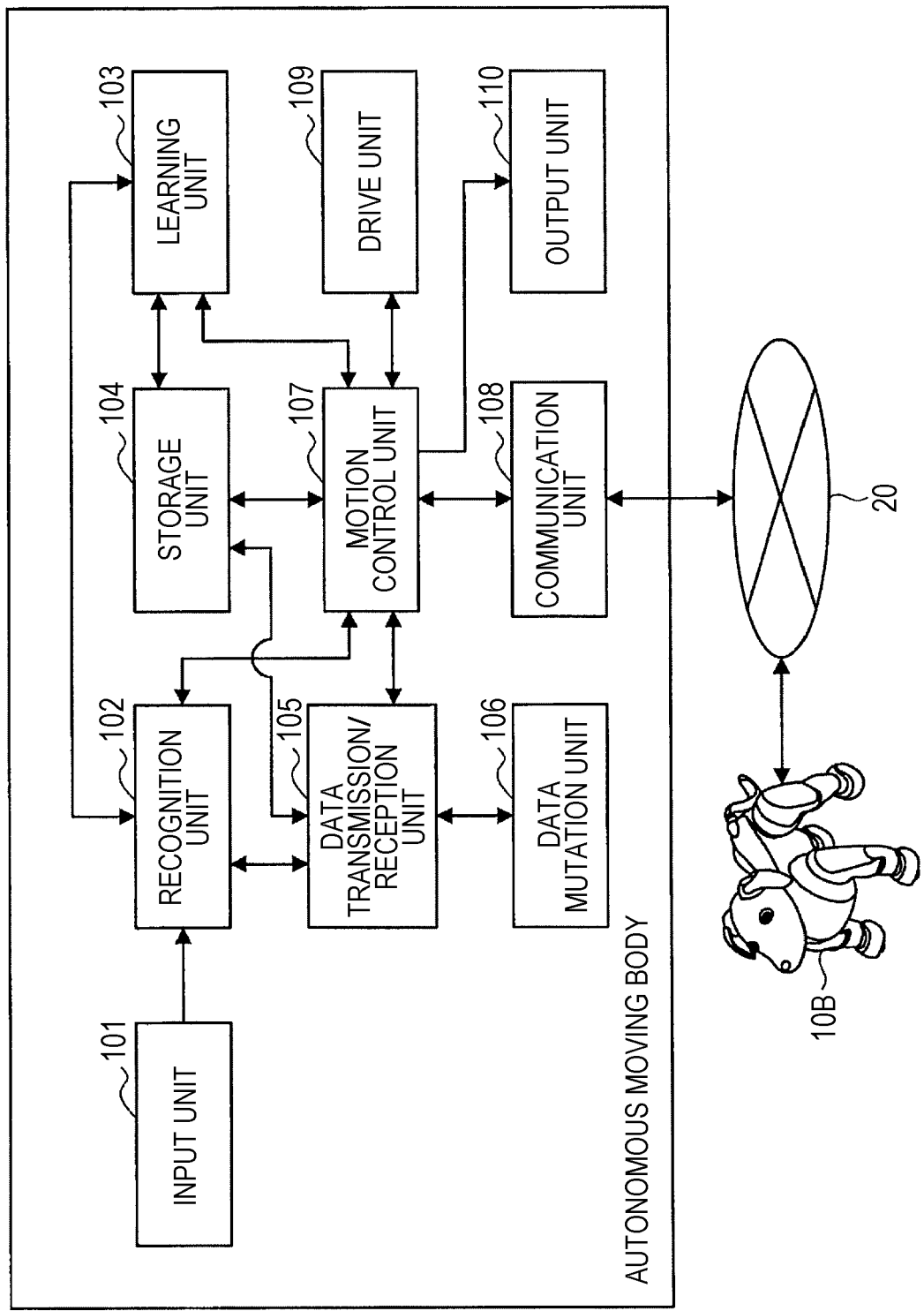
FIG. 7 is a diagram showing a functional configuration example of the autonomous moving body 10 according to the embodiment of the present disclosure.

Next, a functional configuration example of the autonomous moving body 10 according to the embodiment of the present disclosure will be described. FIG. 7 is a diagram showing the functional configuration example of the autonomous moving body 10 according to the embodiment of the present disclosure. Referring to FIG. 7, the autonomous moving body 10 according to the embodiment of the present disclosure includes an input unit 101, a recognition unit 102, a learning unit 103, a storage unit 104, a data transmission/reception unit 105, a data mutation unit 106, a motion control unit 107, a communication unit 108, a drive unit 109, and an output unit 110.

(Input Unit 101)

The input unit 101 has a function to collect various information related to another autonomous moving body 10, the user, and the ambient environment. The input unit 101 collects, for example, utterances of the other autonomous moving body 10 and the user, environmental sounds generated in the surroundings, image information related to the other autonomous moving body 10, the user, and the ambient environment, and various sensor information. For this purpose, the input unit 101 includes the variety of sensors shown in FIG. 1.

(Recognition Unit 102)

The recognition unit 102 has a function to perform a variety of recognitions related to the user, the ambient environment, and the state of the autonomous moving body 10 on the basis of various information collected by the input unit 101. As an example, the recognition unit 102 may perform person identification, facial expression and line-of-sight recognition, object recognition, motion recognition, spatial area recognition, color recognition, shape recognition, marker recognition, obstacle recognition, step recognition, brightness recognition, and the like.

Note that the recognition unit 102 can recognize another autonomous moving body 10. The recognition unit 102 may recognize the other autonomous moving body 10 on the basis of identification information of the other autonomous moving body 10, which is received by the communication unit 108 to be described later. Here, the identification information of the autonomous moving body 10 refers to information unique to each autonomous moving body 10, which is for use in identifying the autonomous moving body 10. Moreover, the autonomous moving body 10 may recognize the other autonomous moving body 10 by the object recognition.

(Learning Unit 103)

The learning unit 103 has a function to learn an environment (situation) and an action, and an influence of the action on the environment. The learning unit 103 achieves the above-described learning, for example, using a machine learning algorithm such as deep learning. Note that the learning algorithm adopted by the learning unit 103 is not limited to the above-described example, and can be appropriately designed.

(Storage Unit 104)

The storage unit 104 has a function to store various internal data related to the autonomous moving body 10. The storage unit 104 may store information related to the recognition of the recognition target and information for executing an action corresponding to the information related to the recognition of the recognition target so that both pieces of the information correspond to each other.

Here, the information related to the recognition processing refers to, for example, a class for use in the recognition processing. Moreover, the storage unit 104 includes the identification information of the autonomous moving body 10. The identification information is used by the recognition unit 102, the data transmission/reception unit 105 to be described later, and the data mutation unit 106 to be described later.

(Data Transmission/Reception Unit 105)

The data transmission/reception unit 105 has a function to determine whether or not to execute transmission/reception of the internal data. Moreover, the data transmission/reception unit 105 has a function to determine which internal data is to be transmitted/received of with reference to the storage unit 104.

The data transmission/reception unit 105 may independently determine whether or not to transmit the internal data and whether or not to receive the internal data. Moreover, the data transmission/reception unit 105 may independently determine which internal data is to be transmitted and which internal data is to be received.

Further, the data transmission/reception unit 105 may determine whether or not to execute the transmission/reception of the internal data on the basis of a magnitude relationship between a transmission/reception probability value and a predetermined threshold value. Here, the transmission/reception probability value is a value for use in determining the transmission/reception of the internal data. Moreover, the transmission/reception probability value is calculated on the basis of, for example, parameters related to the autonomous moving body 10 and identification information received from the other autonomous moving body 10. Note that the data transmission/reception unit 105 may determine which internal data is to be transmitted/received on the basis of the transmission/reception probability value.

Here, the parameters related to the autonomous moving body 10 refer to, for example, the character and age of the autonomous moving body 10, a software version, a remaining battery level, and the like. For example, the character of the autonomous moving body 10 may influence activeness of the action of the autonomous moving body 10. Note that the parameters related to the autonomous moving body 10 may also include information indicating a relationship with the user and the other autonomous moving body 10. For example, the number of encounters, and the like are mentioned as the information indicating the relationship with the user and the other autonomous moving body 10.

Further, a partner to which the data transmission/reception unit 105 transmits/receives the internal data may be, for example, the other autonomous moving body 10. A data transmission/reception unit 105 which the other autonomous moving body 10 has may also determine whether or not to execute the transmission/reception of the internal data. The data transmission/reception unit 105 may determine to execute the transmission/reception of the internal data according to whether or not the data transmission/reception unit 105 of the other autonomous moving body 10 has determined whether or not to execute the transmission/reception of the internal data.

(Data Mutation Unit 106)

The data mutation unit 106 has a function to mutate the internal data when transmitting/receiving the internal data determined by the data transmission/reception unit 105. Here, the mutation means changing a part of the internal data. Specifically, the mutation means changing the internal data to other variations.

Note that the data mutation unit 106 may mutate both internal data to be transmitted and received internal data, or may mutate either thereof.

Moreover, the data mutation unit 106 may calculate a mutation probability value and determine whether or not to mutate the internal data. Here, the transmission/reception probability value is a value for use in the mutation of internal data. Here, the mutation probability value may be calculated on the basis of the parameters related to the autonomous moving body 10 and the identification information of the other autonomous moving body 10.

The data mutation unit 106 may determine whether or not to mutate the internal data on the basis of a magnitude relationship between the mutation probability value and a predetermined threshold value. The data mutation unit 106 may calculate the mutation probability value only in a case where the data transmission/reception unit 105 determines to transmit the internal data. On the other hand, the data mutation unit 106 may calculate the mutation probability value only in a case where the data transmission/reception unit 105 determines to receive the internal data. The data mutation unit 106 may determine whether or not to execute the calculation of the mutation probability value according to the type of the internal data to be transmitted/received.

Note that the data mutation unit 106 may calculate the mutation probability value using one or more parameters related to the autonomous moving body 10. For example, Equation (1) shows a result of adding functions, which are output and weighted by the respective parameters, to one another.

[Equation 1]

$$f(x) = w_1 f_1(x_1) + w_2 f_2(x_2) + \ldots + w_n f_n(x_n) \quad (1)$$

Next, the result calculated by Equation (1) is substituted into a probabilistic function, for example, a sigmoid function such as Equation (2).

[Equation 2]

$$m_k = \frac{1}{1 + e^{-af(x)}} \quad (2)$$

The data mutation unit 106 may determine whether or not to mutate the internal data, for example, on the basis of a magnitude relationship between such an output result of the probabilistic function as Equation (2) and a predetermined threshold value.

(Motion Control Unit 107)

The motion control unit 107 has a function to plan the action to be performed by the autonomous moving body 10 on the basis of the situation estimated by the recognition unit 102 and knowledge learned by the learning unit 103. Moreover, the motion control unit 107 has a function to control operations of the drive unit 109 and the output unit 110 on the basis of the planned action plan. The motion control unit 107 performs rotation control of the actuators 570, display control of the displays 510, voice output control by a speaker, and the like, for example, on the basis of the above-described action plan.

Moreover, the motion control unit 107 has a function to cause the drive unit 109 and the output unit 110 to express the execution of the transmission/reception of the internal data by actions when transmitting/receiving the internal data. Specifically, the motion control unit 107 controls the drive unit 109 and the output unit 110 to express a content of the internal data, which is determined by the data transmission/reception unit 105, by the action of the autonomous moving body 10 so that the user can grasp the content.

Note that the action that expresses the execution of the transmission/reception of the internal data may be one by which the user can directly understand the content of the internal data, or may be one by which the user can indirectly understand the content of the internal data. A specific example of the expression by the action of the autonomous moving body 10 will be described later.

(Communication Unit 108)

The communication unit 108 has a function to perform information communication with the other autonomous moving body 10. For example, the communication unit 108 transmits the internal data and the like to the other autonomous moving body 10. Moreover, for example, the communication unit 108 receives the internal data from the other autonomous moving body 10.

Moreover, in a case where the recognition unit 102 recognizes the other autonomous moving body 10, the communication unit 108 may transmit/receive identification information to/from the other autonomous moving body 10.

(Drive Unit 109)

The drive unit 109 has a function to bend and stretch a plurality of joint portions the autonomous moving body 10 has, on the basis of the control by the motion control unit 107. More specifically, the drive unit 109 drives the actuators 570 which the respective joint portions include, on the basis of the control by the motion control unit 107.

(Output Unit 110)

The output unit 110 has a function to output visual information and sound information on the basis of the control by the motion control unit 107. For this purpose, the output unit 110 includes the displays 510 and the speaker.

The functional configuration example of the autonomous moving body 10 according to the embodiment of the present disclosure has been described above. Note that the above-described configurations described with reference to FIG. 7 are merely an example, and the functional configuration of the autonomous moving body 10 according to the embodiment of the present disclosure is not limited to such an example. The functional configuration of the autonomous moving body 10 according to the embodiment of the present disclosure can be flexibly modified according to the specifications and the operations.

Moreover, the autonomous moving body 10 is able to communicate with the other autonomous moving body 10 using the communication unit 108. Note that the autonomous moving body 10 may communicate directly with the other autonomous moving body 10, or may communicate therewith via a network 20 shown in FIG. 7.

Moreover, although not shown in FIG. 7, a part of the storage unit 104 may be provided on an information processing server connected to the autonomous moving body 10 via the network 20. For example, the information processing server may transmit/receive the internal data to/from the autonomous moving body 10 as appropriate.

<<1.4. Specific Example>>

Figure 8:
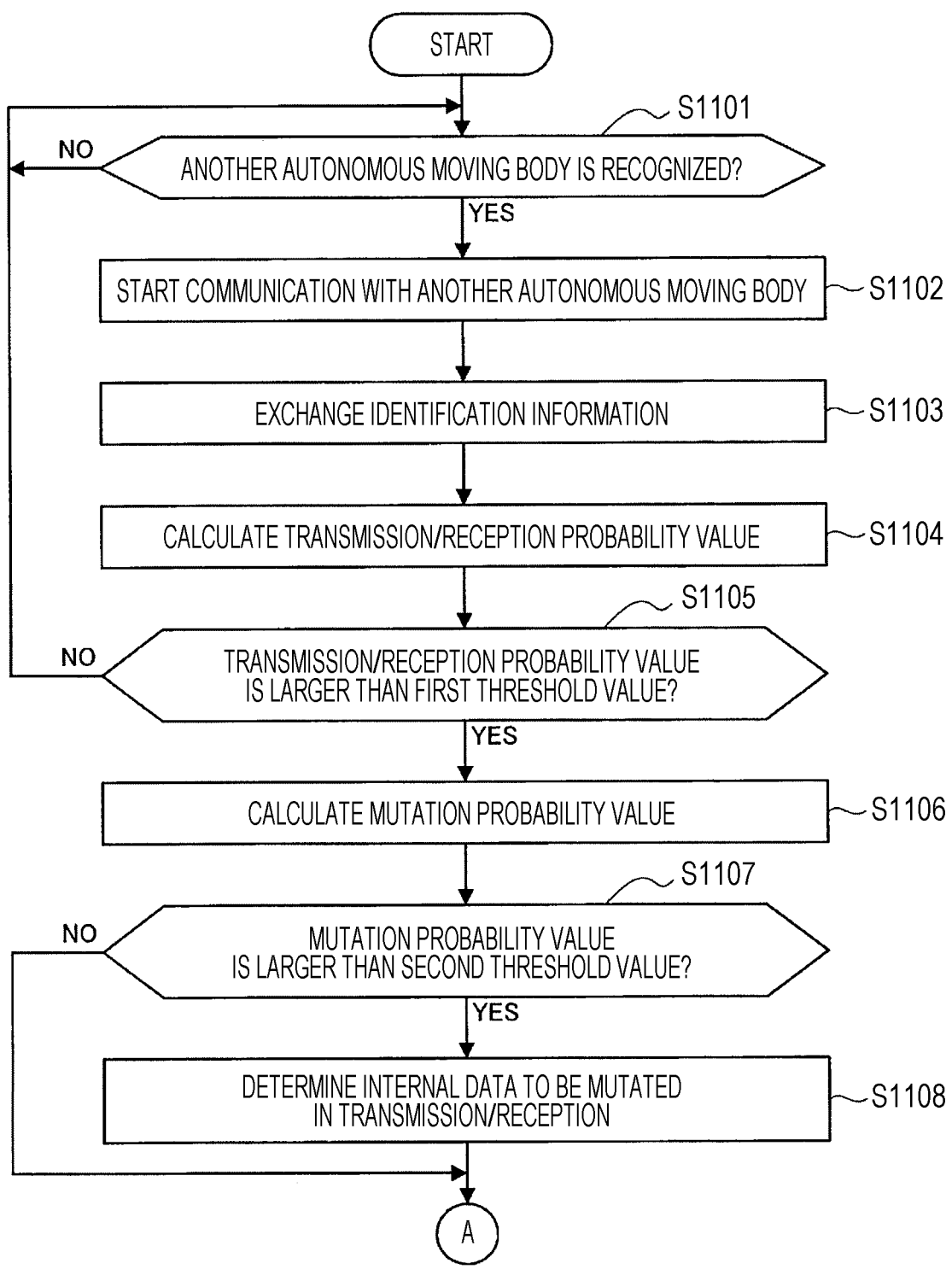
FIG. 8 is a diagram for explaining an overall flow in transmission/reception of internal data by the autonomous moving body 10 according to the present embodiment.
Figure 9:
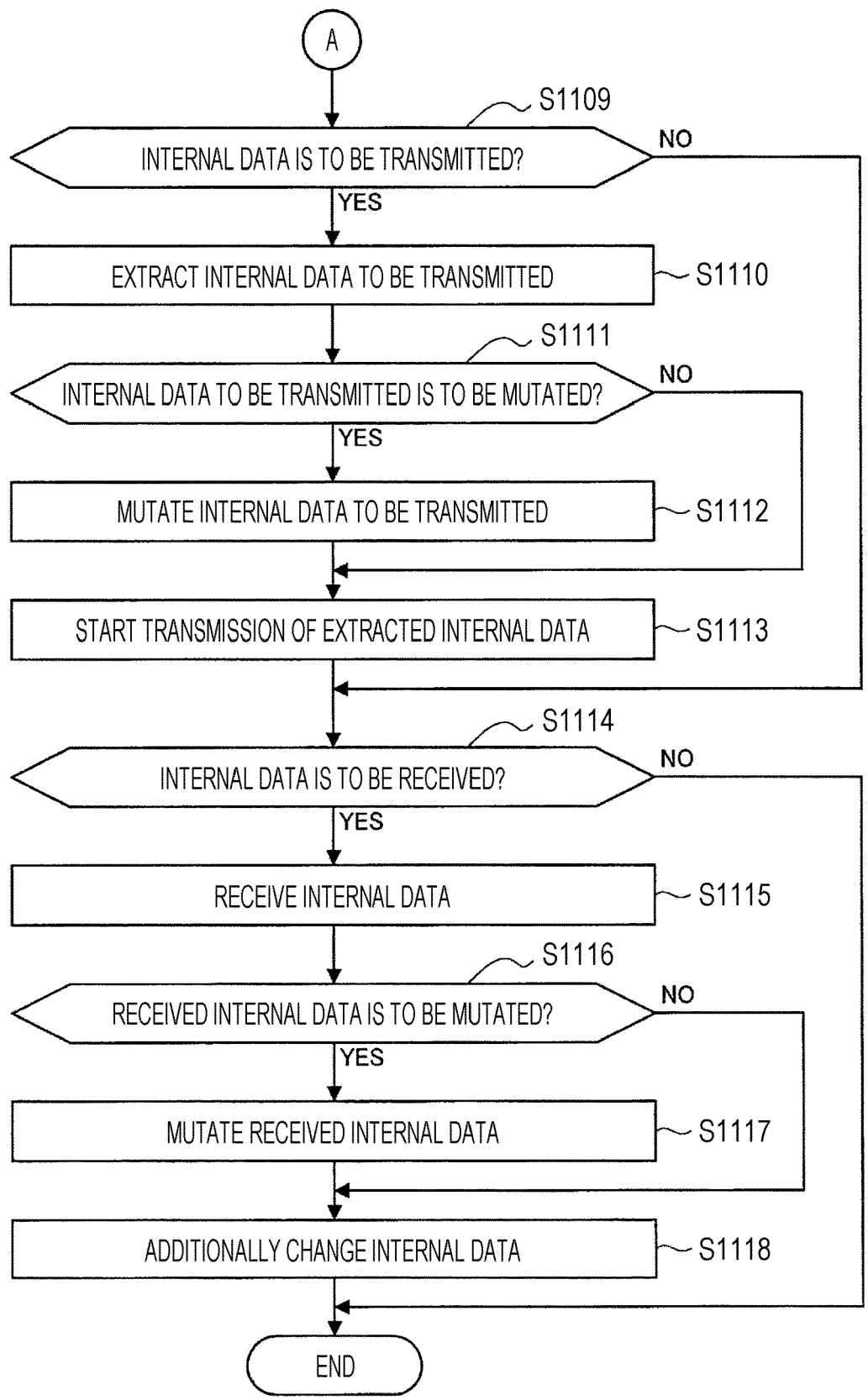
FIG. 9 is a diagram for explaining the overall flow in the transmission/reception of the internal data by the autonomous moving body 10 according to the same embodiment.

A specific example of the control by the motion control unit 107 according to the present embodiment will be described below. First, an overall flow in the transmission/reception of the internal data by the autonomous moving body 10 will be described. FIGS. 8 and 9 are diagrams for explaining an example of the overall flow in the transmission/reception of the internal data by the autonomous moving body 10 according to the present embodiment.

Referring to FIG. 8, first, in a case where the recognition unit 102 recognizes another autonomous moving body 10 (S1101: YES), the communication unit 108 starts communication with the other autonomous moving body 10 (S1002). On the other hand, in a case where the recognition unit 102 does not recognize the other autonomous moving body 10 (S1101: NO), the process returns to step S1101. After executing step S1102, the communication unit 108 exchanges identification information with the other autonomous moving body 10 (S1103). Next, the data transmission/reception unit 105 calculates the transmission/reception probability value on the basis of the parameters related to the autonomous moving body 10 and the identification information of the other autonomous moving body 10 (S1104).

Next, in a case where the transmission/reception probability value is not larger than a first threshold value (S1105: NO), the process returns to step S1101. On the other hand, in a case where the transmission/reception probability value is larger than the first threshold value (S1105: YES), the data mutation unit 106 calculates the mutation probability value on the basis of the parameters related to the autonomous moving body 10 and the identification information of the other autonomous moving body 10 (S1106).

Next, in a case where the mutation probability value is not larger than a second threshold value (S1107: NO), the process proceeds to step S1109. On the other hand, in a case where the mutation probability value is larger than the second threshold value (S1107: YES), the data mutation unit 106 determines the internal data to be mutated at the time of transmission/reception thereof (S1108).

Subsequently, referring to FIG. 9, first, in a case where the data transmission/reception unit 105 has not determined to transmit the internal data (S1109: NO), the process proceeds to step S1114. On the other hand, in a case where the data transmission/reception unit 105 has determined to transmit the internal data (S1109: YES), the data transmission/reception unit 105 extracts, from the storage unit 104, the internal data to be transmitted (S1110).

Next, in a case where the data mutation unit 106 has not determined to mutate the internal data (S1111: NO), the process proceeds to step S1113. On the other hand, in a case where the data mutation unit 106 has determined to mutate the internal data (S1111: YES), the data mutation unit 106 mutates the internal data extracted in step S1110 (S1112). Next, the communication unit 108 transmits the internal data, which is extracted in step S1110, to the other autonomous moving body 10 (S1113).

Next, in a case where the data transmission/reception unit 105 has not determined to receive the internal data (S11114: NO), the autonomous moving body 10 ends the process. On the other hand, in a case where the data transmission/reception unit 105 has determined to receive the internal data (S1114: YES), the communication unit 108 receives the internal data from the other autonomous moving body 10 (S1115).

Next, in a case where the data mutation unit 106 has not determined to mutate the received internal data (S1116: NO), the process proceeds to step S1118. On the other hand, in a case where the data mutation unit 106 has determined to mutate the received internal data (S1116: YES), the data mutation unit 106 mutates the internal data received in step S1115 (S1117). Next, the data transmission/reception unit 105 updates the internal data, which is received in step S1115, by causing the storage unit 104 to additionally change the same (S1118), and the autonomous moving body 10 ends the process.

As described above, the autonomous moving body 10 can execute the transmission/reception of the internal data and the mutation of the internal data. Note that the flow of the operations, which is described above, is merely an example, and the transmission/reception of the internal data and the mutation of the internal data are not limited to such an example.

Details of the control by the motion control unit 107 of the autonomous moving body 10 will be described below while mentioning specific examples. First, a case where the internal data transmitted/received is information for use in identification processing by the autonomous moving body 10 will be described.

Figure 10B:
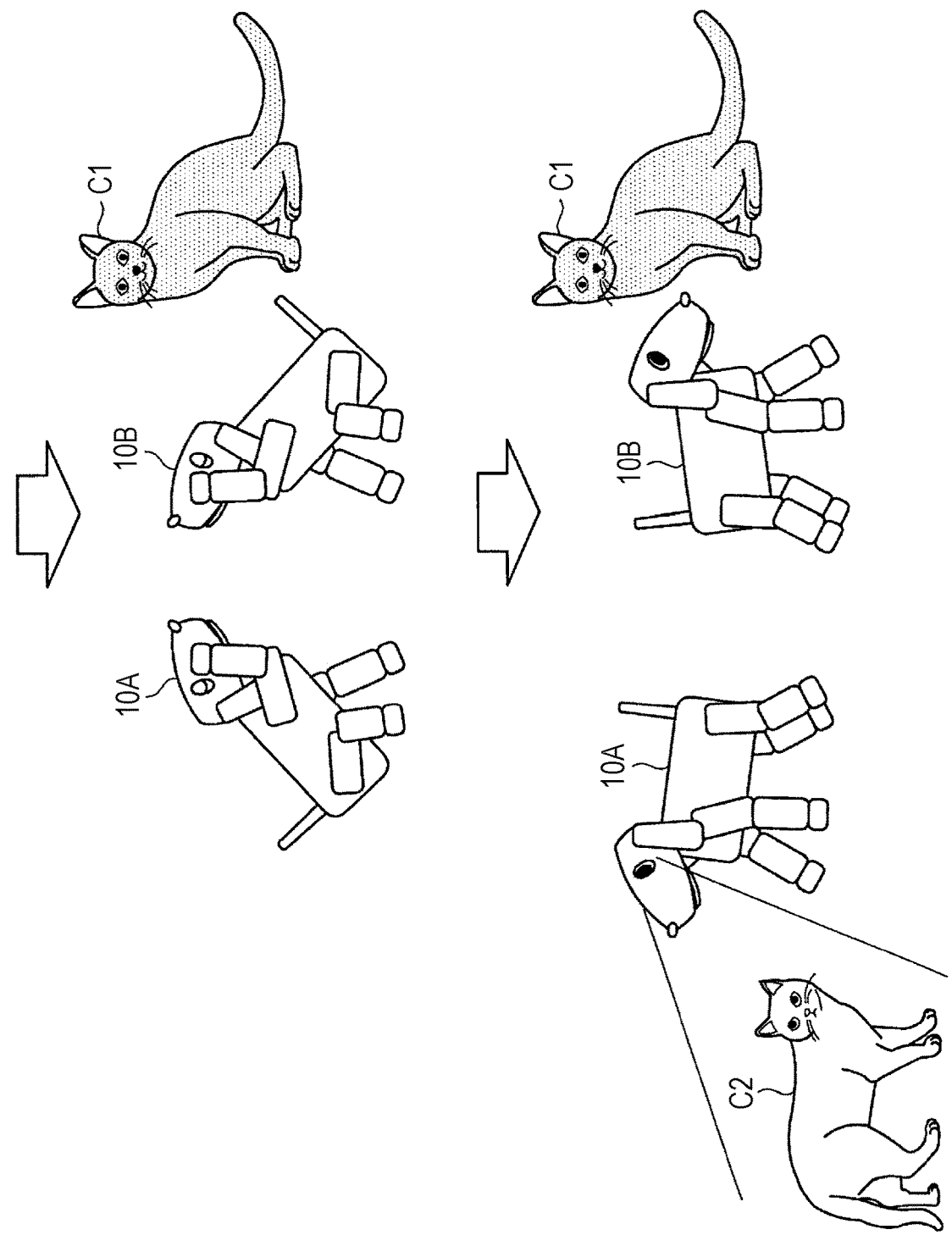
FIG. 10B is a diagram for explaining the example of expressing, by the action, the execution of the transmission/reception of the information related to the recognition processing by the motion control unit 107 according to the same embodiment.

FIGS. 10A and 10B are diagrams for explaining an example of expressing, by actions, the execution of the transmission/reception of information related to the recognition processing by the motion control unit 107 according to the present embodiment. FIG. 10 shows an autonomous moving body 10A, an autonomous moving body 10B, and a recognition target C1.

Note that, as a premise, since the autonomous moving body 10A does not have information for use in identification processing corresponding to the recognition target C1, the autonomous moving body 10A is in a state of being incapable of recognizing what the recognition target C1 is. On the other hand, since the autonomous moving body 10B has the information for use in the identification processing corresponding to the recognition target C1, the autonomous moving body 10B is in a state of being capable of recognizing that the recognition target C1 is a "cat".

On an upper side of FIG. 10A, the autonomous moving body 10B interacts with the recognition target C1. Here, the autonomous moving body 10B recognizes that the recognition target C1 is a "cat".

Next, on a lower side of FIG. 10A, the autonomous moving body 10A is approaching the autonomous moving body 10B and the recognition target C1. Here, the autonomous moving body 10A receives information related to recognition processing of the recognition target C1 from the autonomous moving body 10B. Here, the information related to the recognition processing is an example of the internal data. Moreover, at the same time, the autonomous moving body 10A receives, from the autonomous moving body 10B, information for executing motions corresponding to the recognition target C1.

On an upper side of FIG. 10B, the autonomous moving body 10A has completed the reception of the information, which is related to the recognition of the recognition target C1, from the autonomous moving body 10B. Thus, the autonomous moving body 10A and the autonomous moving body 10B express the transmission/reception of the information, which is related to the information related to the recognition of the recognition target C1, by a "motion of wiping the face" on the basis of the information for executing the motion corresponding to the recognition target C1. Here, the "motion of wiping the face" is a gesture executed by a cat (gesture that is reminiscent of a cat).

Here, the information for executing the motion corresponding to the recognition target may be a motion for executing such a motion that the user can associate what the recognition target is. Note that, in addition to the motion, for example, voice may be used to determine what the recognition target is.

Next, on a lower side of FIG. 10B, the autonomous moving body 10A is made capable of recognizing a recognition target C2, which is another "cat", on the basis of the information related to the recognition processing of the "cat", the information having been received from the autonomous moving body 10B.

As described above, the information related to the recognition processing of the recognition target and the information for executing the motion corresponding to the recognition target can be transmitted/received. According to such a function, the autonomous moving body 10 can express, to the user, an increase in the types of recognizable objects on the basis of the transmission/reception of the internal data.

Figure 11:
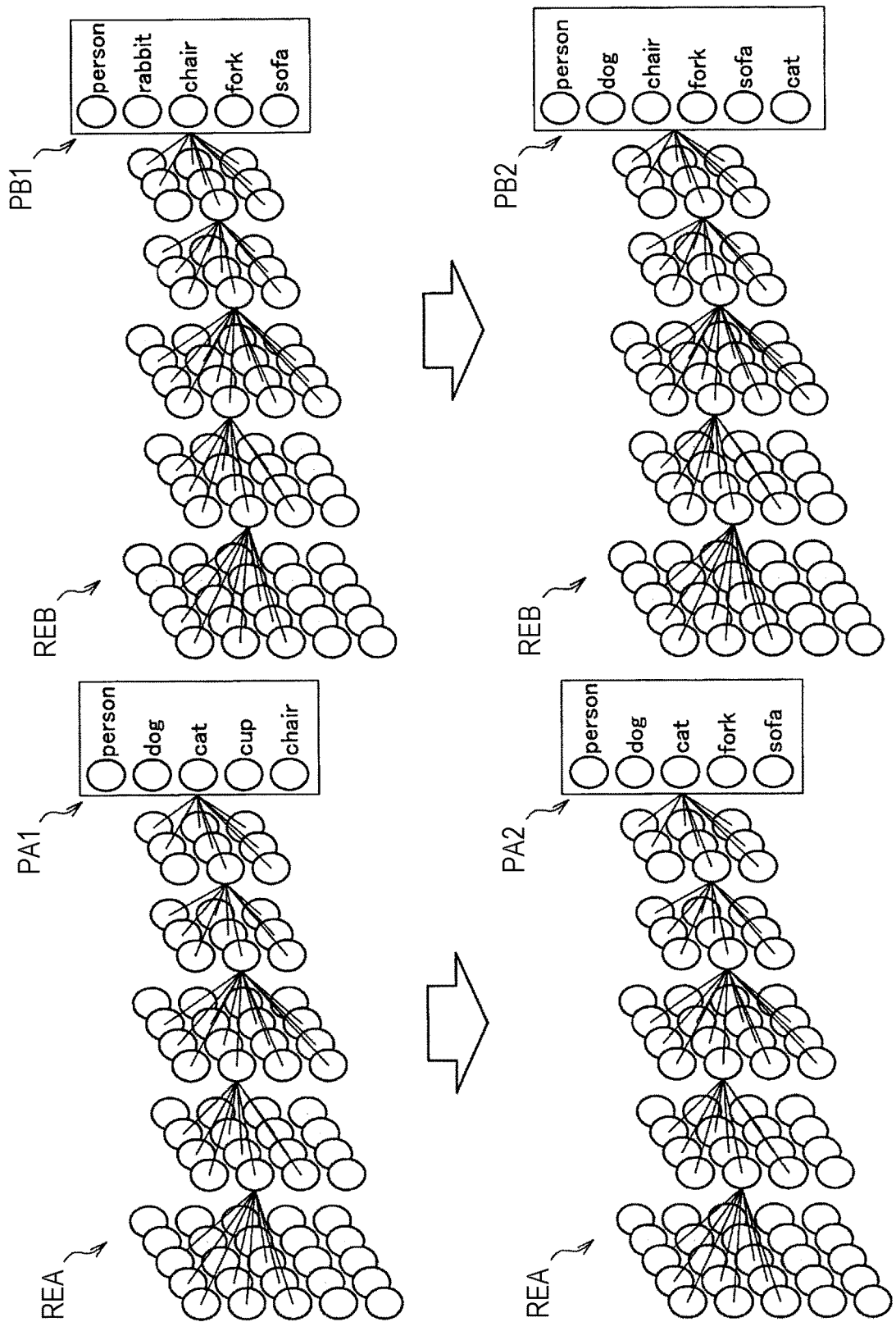
FIG. 11 is a diagram for conceptually explaining extraction of feature quantities related to the recognition processing according to the same embodiment.

Here, as an example of the information related to the recognition processing, classes related to the recognition processing will be conceptually described. FIG. 11 is a diagram for conceptually explaining the classes related to the recognition processing. FIG. 11 shows a feature quantity extractor REA and class PA1 of the autonomous moving body 10A, and a feature quantity extractor REB and class PB1 of the autonomous moving body 10B.

On an upper side of FIG. 11, it is shown that the autonomous moving body 10A is able to recognize objects shown in the class PA1. Likewise, it is shown that the autonomous moving body 10B is able to recognize objects shown in the class PB1.

Here, the autonomous moving body 10A and the autonomous moving body 10B transmit/receive the class related to the recognition processing, and can thereby additionally change the recognition target. An example of FIG. 11 will be described below. It is assumed that the autonomous moving body 10A is able to recognize a "dog" shown in the class PA1. Likewise, it is assumed that the autonomous moving body 10B is able to recognize "fork" and "sofa" which are shown in the class PB1.

As shown on a lower side of FIG. 11, a "dog" class, a "fork" class, and a "sofa" class are transmitted to another autonomous moving body 10 by the data transmission/reception unit 105 of the autonomous moving body 10A and the data transmission/reception unit 105 of the autonomous moving body 10B. The transmitted classes are merged. Here, as shown in a class PA2 of the autonomous moving body 10A, the recognition unit 102 of the autonomous moving body 10A is able to recognize the "fork" class and the "sofa" class. Further, as shown in a class PB2 of the autonomous moving body 10B, the recognition unit 102 of the autonomous moving body 10B is able to recognize the "dog" class.

As described above, the transmission/reception of the class information is executed, whereby it is made possible to save a trouble of the autonomous moving body 10 learning a new recognition target.

Note that, as shown in FIG. 11, the data transmission/reception unit 105 of the autonomous moving body 10 may simultaneously execute deletion of other classes in addition to the addition of the classes related to the recognition processing. This will be described in an example on the lower side of FIG. 11. When transmitting/receiving and merging the classes related to the recognition processing, the data transmission/reception unit 105 of the autonomous moving body 10A deletes a "cup" class and a "chair" class, which have been presented in the class PA1. Moreover, the data transmission/reception unit 105 of the autonomous moving body 10A deletes a "rabbit" class that has been present in the class PA1.

As described above, not only the addition of the classes but also the deletion of the classes is executed, thus making it possible to save an amount of data to be stored in the autonomous moving body 10. For example, the data transmission/reception unit 105 of the autonomous moving body 10 may preferentially delete a recognition target class that is less frequently recognized by the recognition unit 102 among the classes to be stored in the storage unit 104. On the other hand, the data transmission/reception unit 105 of the autonomous moving body 10 may only add a class without deleting the class.

Figure 12:
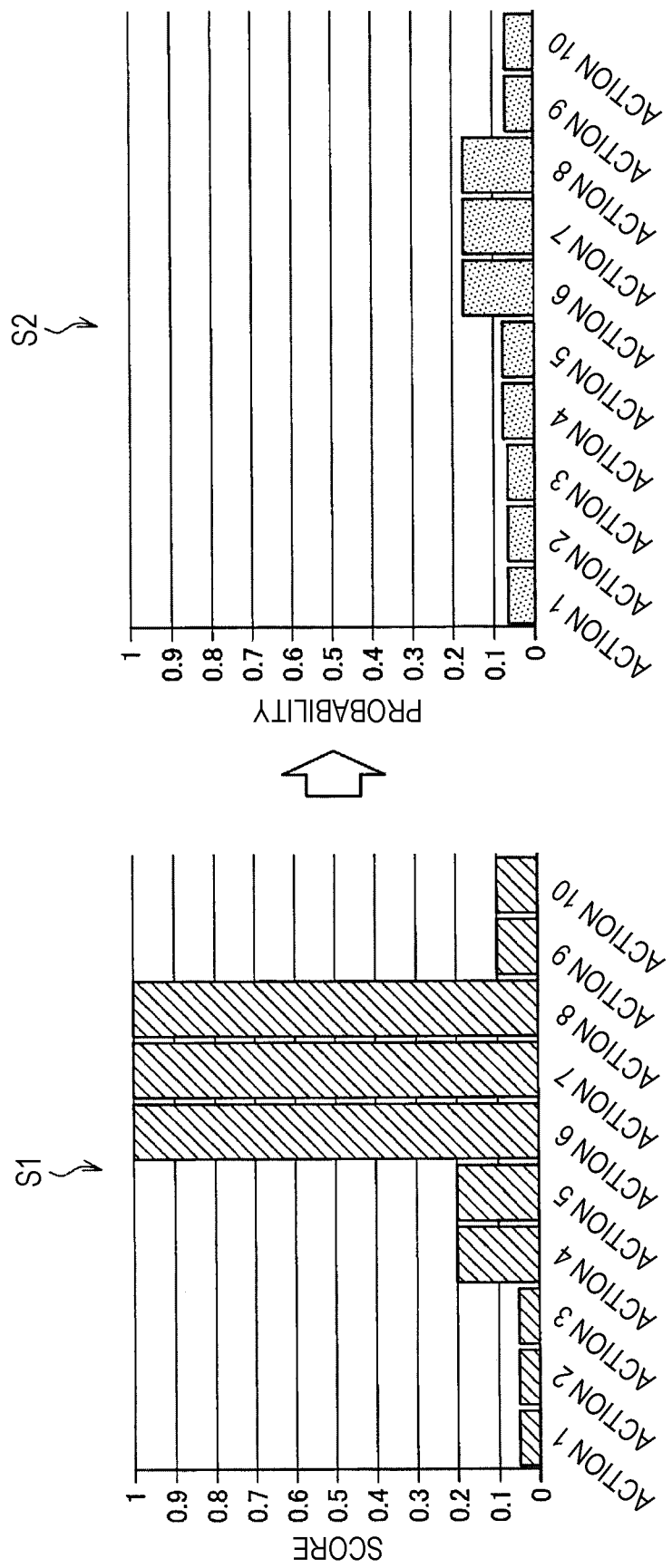
FIG. 12 is a diagram for explaining an example of mutation of information related to recognition processing by a data transmission/reception unit 105 and a data mutation unit 106 according to the same embodiment.

Incidentally, there may be a plurality of types of the motions corresponding to the recognition target. Here, an example of determination and mutation of the action, which corresponds to the recognition target, by the data transmission/reception unit 105 and the data mutation unit 106 will be described. FIG. 12 is a diagram for explaining an example of mutation of the information related to the recognition processing by the data transmission/reception unit 105 and the data mutation unit 106 according to the present embodiment. FIG. 12 shows a graph S1 of a score corresponding to each action of the autonomous moving body 10, which corresponds to a predetermined recognition target, and shows a graph S2 of a probability that the autonomous moving body 10 can take each action.

A score of each action shown on a left side of FIG. 12 is calculated according to the recognition target. Here, the score is a value for use when the autonomous moving body 10 determines which action is to be executed at the time of executing the action corresponding to the recognition target. Moreover, the action here includes an action of "wiping the face", for example, in a case where the action is an action corresponding to recognition processing of a cat. In addition to the action (gesture) of the autonomous moving body 10, for example, an action of searching for a cat in a case where the autonomous moving body 10 becomes able to recognize the cat, and the like are included.

Note that a score of an action having a high affinity with the recognition target may be set higher than scores of other actions. Here, the data transmission/reception unit 105 converts each score into a probability P on the basis of, for example, a softmax function shown in Equation (3). Here, C is a number for identifying each action, and Score is the score of each action shown on the left side of FIG. 12.

[Equation 3]

$$P_j = \frac{e^{Score_c}}{\sum_{c=1}^{N} e^{Score_c}} \quad (3)$$

A probability shown on a right side of FIG. 12 is a probability for use in selecting an action when expressing the transmission/reception of the information related to the recognition processing of the recognition target. The data transmission/reception unit 105 determines an action, which is caused to be executed by the autonomous moving body 10, on the basis of the probability shown in the probability graph S2.

Here, on the left side of FIG. 12, the data mutation unit 106 may mutate the score, which corresponds to each action, on the basis of the mutation probability value. Specifically, the data mutation unit 106 may change the score, which corresponds to each action, by using the calculated mutation probability value. The data mutation unit 106 mutates each score, whereby the probability of the action determined by the data transmission/reception unit 105 changes.

As described above, even in a case where a plurality of the autonomous moving bodies 10 is present, each autonomous moving body 10 can make an expression to the same recognition target by a different action. According to such a function, even a user who possesses a plurality of the autonomous moving bodies 10 becomes able to enjoy a difference in action executed by each autonomous moving body 10.

Figure 13:
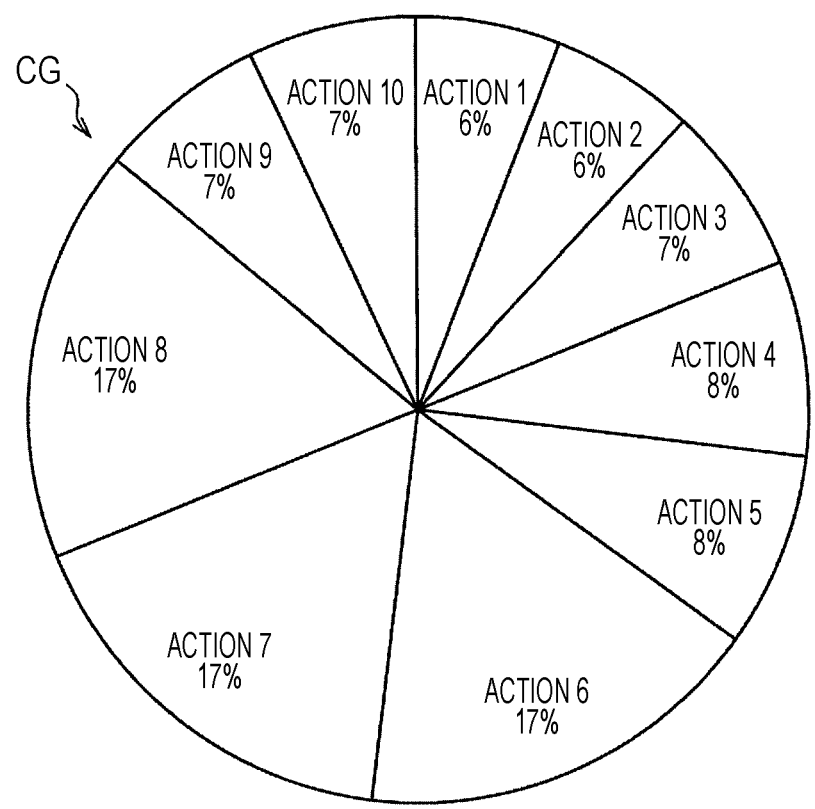
FIG. 13 is a diagram for explaining an example of a probability that each action expressing the transmission/reception of the information related to the recognition processing according to the same embodiment is selected.

FIG. 13 is a diagram for explaining an example of a probability that each action expressing the transmission/reception of the information related to the recognition processing according to the present embodiment is selected. As shown in the example of FIG. 13, by using the probability, it is made possible to determine the action expressing the transmission/reception of the information related to the recognition processing.

Figure 14:
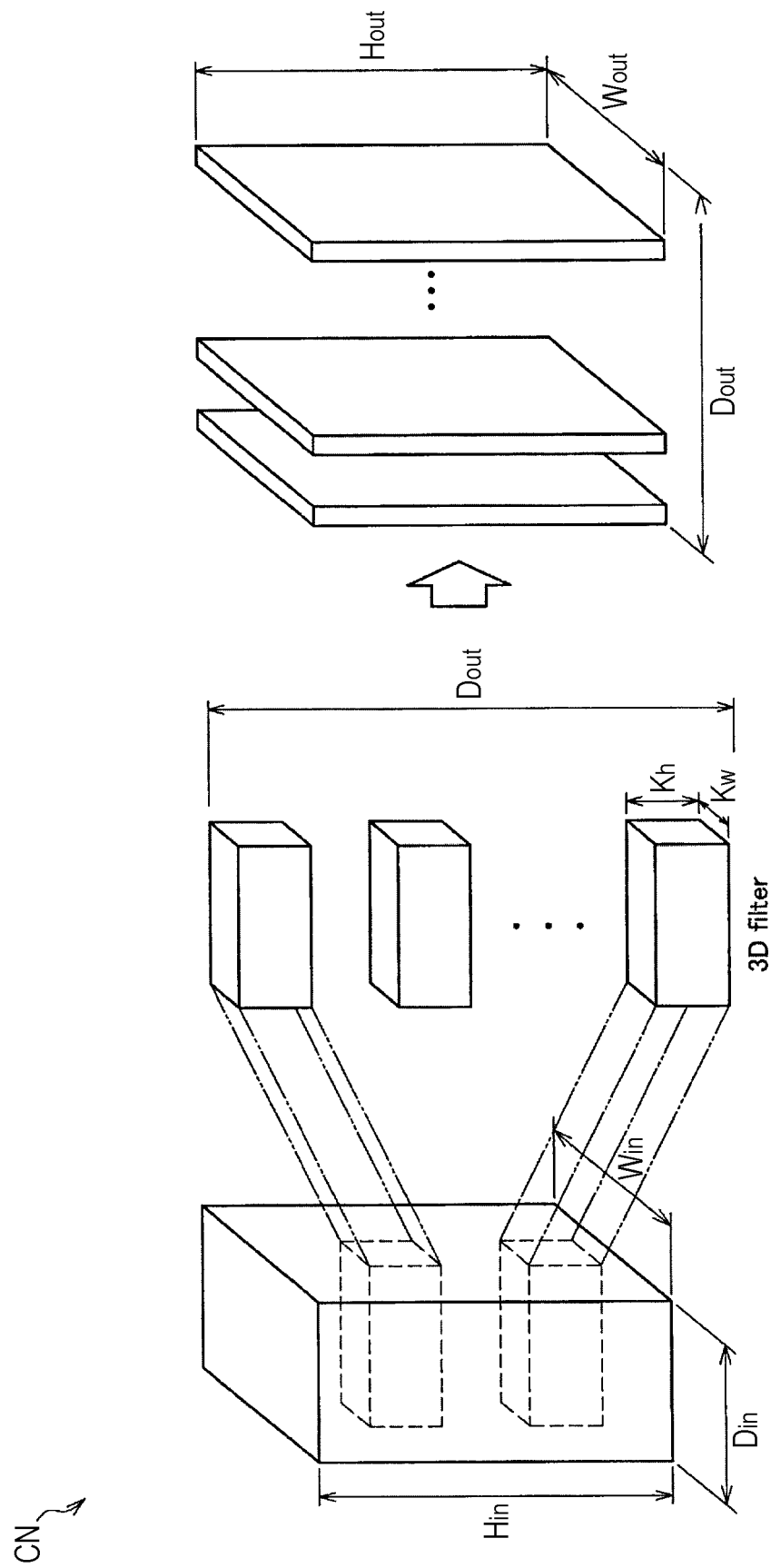
FIG. 14 is a diagram for explaining transmission/reception of information related to a convolutional neural network according to the same embodiment.

In the above, the transmission/reception of the class related to the recognition processing has been described as an example. However, for example, a target recognizable even in transmission/reception of information related to a convolutional neural network can be added. FIG. 14 is a diagram for explaining the transmission/reception of the information related to the convolutional neural network according to the present embodiment. FIG. 14 shows a conceptual diagram CN of the convolutional neural network.

On a left side of FIG. 14, feature quantity data to be stored as a three-dimensional quantity is shown. On a middle figure of FIG. 14, three-dimensional filters to be applied to the feature quantity data are shown. On a right side of FIG. 14, a result of convolution by the three-dimensional filters is shown. In an example of FIG. 14, the result of the convolution may be a two-dimensional heat map.

The data transmission/reception unit 105 of the autonomous moving body 10 may determine filter information as the internal data to be transmitted/received. Addition or deletion of the filter information is performed, whereby the target (class) recognizable by the recognition unit 102 of the autonomous moving body 10 changes. Here, the filter information refers to a size of a kernel related to the filter, and the like.

Figure 15:
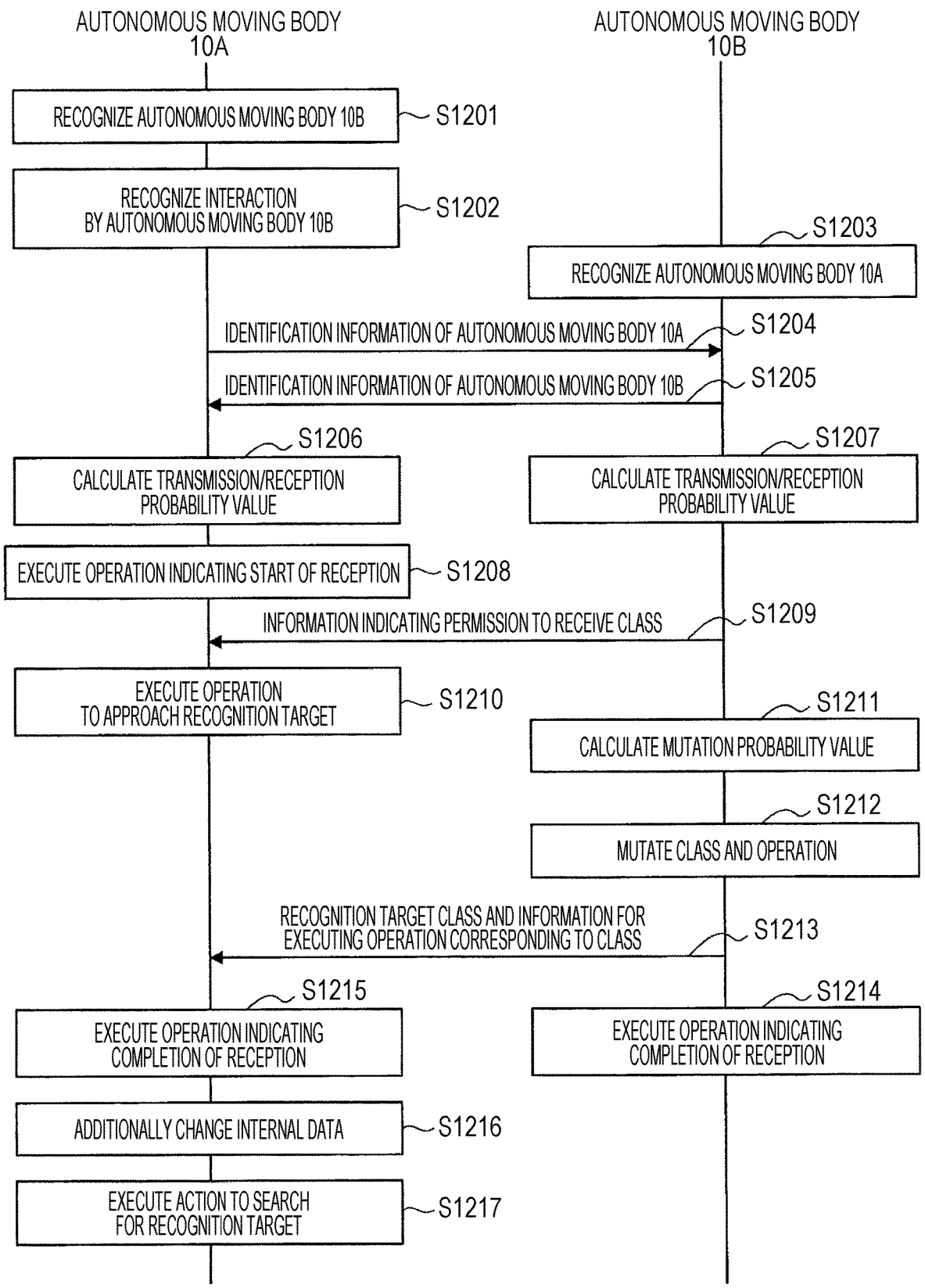
FIG. 15 is a diagram for explaining an example of a flow of operations related to the transmission/reception of the information related to the recognition processing by the autonomous moving bodies 10 according to the same embodiment and related to the expression of the transmission/reception.

Subsequently, a description will be given of an example of a flow of operations related to the transmission/reception of the information related to the recognition processing by the autonomous moving bodies 10 and related to the expression of the transmission/reception. FIG. 15 is a diagram for explaining the example of the flow of the operations related to the transmission/reception of the information related to the recognition processing by the autonomous moving bodies 10 according to the present embodiment and related to the expression of the transmission/reception.

Referring to FIG. 15, first, the recognition unit 102 of the autonomous moving body 10A recognizes the autonomous moving body 10B (S1201). Next, the recognition unit 102 of the autonomous moving body 10A recognizes that the autonomous moving body 10B is interacting with the recognition target (S1202). On the other hand, the recognition unit 102 of the autonomous moving body 10B also recognizes the autonomous moving body 10A (S1203). Next, the communication unit 108 of the autonomous moving body 10A transmits the identification information of the autonomous moving body 10A to the autonomous moving body 10B (S1204). On the other hand, the communication unit 108 of the autonomous moving body 10B also transmits the identification information of the autonomous moving body 10B to the autonomous moving body 10A (S1205).

Next, the data transmission/reception unit 105 of the autonomous moving body 10A calculates the transmission/reception probability value on the basis of the parameters of the autonomous moving body 10A and the identification information of the autonomous moving body 10B (S1206). The data transmission/reception unit 105 of the autonomous moving body 10B also calculates the transmission/reception probability value on the basis of the parameters of the autonomous moving body 10B and the identification information of the autonomous moving body 10A (S1207). Next, the motion control unit 107 of the autonomous moving body 10A causes the drive unit 109 and the output unit 110 to execute a motion indicating, to the autonomous moving body 10B, the start of reception of the class related to the recognition processing of the recognition target (S1208).

Next, the communication unit 108 of the autonomous moving body 10B transmits information indicating a permission to receive the recognition target class to the autonomous moving body 10A (S1209). Next, the motion control unit 107 of the autonomous moving body 10A controls the drive unit 109 to execute a motion of approaching the recognition target (S1210). Next, the data mutation unit 106 of the autonomous moving body 10B calculates the mutation probability value (S1211). Next, the data mutation unit 106 of the autonomous moving body 10B mutates the class and the motion corresponding to the class on the basis of the mutation probability value calculated in step S1211 (S1212).

Next, the communication unit 108 of the autonomous moving body 10B transmits the recognition target class and the information for executing the motion corresponding to the class to the autonomous moving body 10A (S1213). Next, the motion control unit 107 of the autonomous moving body 10B causes the drive unit 109 and the output unit 110 to execute the motion corresponding to the information received in step S1213 (S1215). Moreover, the motion control unit 107 of the autonomous moving body 10A also causes the drive unit 109 and the output unit 110 to execute the motion corresponding to the information transmitted in step S1213 (S1215).

Next, the data transmission/reception unit 105 of the autonomous moving body 10A causes the storage unit 104 to store the class received in step S1213 and the information for executing the motion corresponding to the class, thereby updating the internal data (S1216). Next, the motion control unit 107 of the autonomous moving body 10A causes the drive unit 109 to execute an action of searching for the recognition target corresponding to the class received in step S1213 (S1217), and the autonomous moving body 10 ends the motion.

The autonomous moving body 10 expresses, by the action, the transmission/reception of the class corresponding to the recognition target as described above, whereby the user becomes able to understand that the autonomous moving body 10 has been provided with the information related to the recognition target from the other autonomous moving body 10.

Up to the above, the expression of the transmission/ reception of the information related to the recognition of the recognition target has been described; however, the information to be transmitted/received may be an environment map. For example, the autonomous moving body 10 receives the environment map from the other autonomous moving body 10, whereby the autonomous moving body 10 becomes able to move in a state of understanding the environment even in a place where the autonomous moving body 10 has never been.

Figure 16:
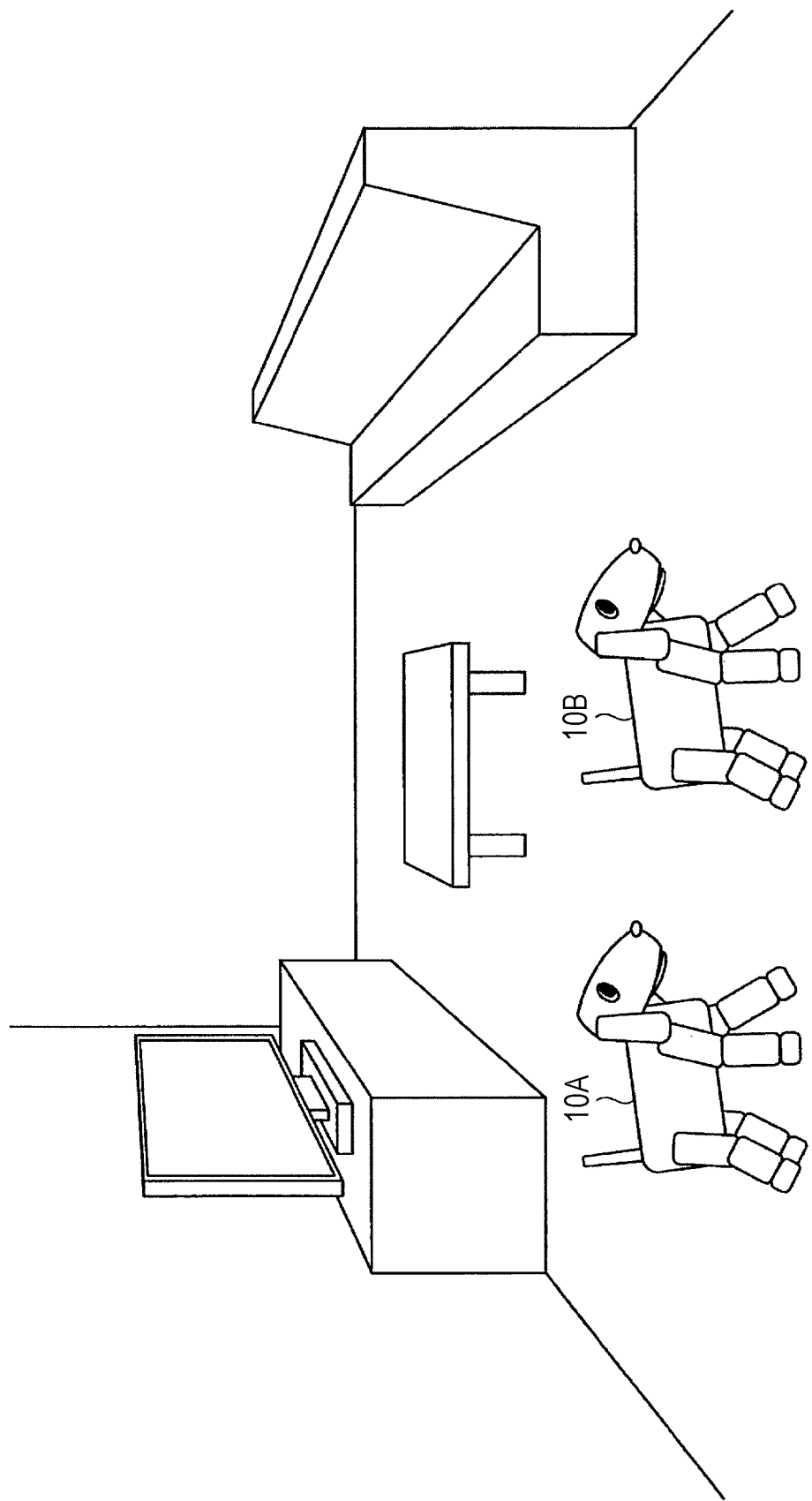
FIG. 16 is a diagram for explaining an action expressing execution of transmission/reception of an environment map by the autonomous moving body 10 according to the same embodiment.

FIG. 16 is a diagram for explaining an action expressing the execution of the transmission/reception of the environment map by the autonomous moving body 10 according to the present embodiment. FIG. 16 shows the autonomous moving body 10A and the autonomous moving body 10B.

The motion control unit 107 of the autonomous moving body 10 causes, by an action, the expression of the execution of the transmission/reception of the environment map, the execution being done by the data transmission/reception unit 105, when transmitting/receiving the environment map. Specifically, the motion control unit 107 of the autonomous moving body 10 controls the drive unit 109 and the output unit 110 so that the user can understand that the transmission/reception of the environment map of a predetermined place is being executed.

In an example of FIG. 16, the autonomous moving body 10B is executing an action of making a guide of an inside of a room, while the autonomous moving body 10A is executing an action of following the autonomous moving body 10B. The autonomous moving body 10A follows the autonomous moving body 10B as described above, whereby the user becomes able to understand that the transmission/ reception of the environment map is being executed.

Note that, when the autonomous moving body 10 transmits/receives the environment map, an attention level map may also be transmitted/received as additional information. Here, the attention level map is map information indicating a place having an additional meaning to a predetermined environment map. Specifically, the attention level map refers to map information for showing a place having a special meaning to the user, for example, a place where the user is likely to be present, a place where the user dislikes the autonomous moving body 10 to enter, or the like.

FIG. 17 is a diagram for explaining an example of the environment maps and the attention level map, which are to be transmitted/received by the autonomous moving body 10 according to the present embodiment. FIG. 17 shows an environment map M1, an attention level map M2, and an environment map M3 modified by the attention level map M2.

In FIG. 17, the environment map M1 shows a floor plan of a room and an installation status of furniture. The attention level map M2 is a map corresponding to the environment map M1.

A description will be given below in an example of FIG. 17. For example, a place of interest A1 is a place where the user praises the autonomous moving body 10 when the autonomous moving body 10 enters the place. Moreover, for example, a place of interest A2 is a place that has a special meaning to the user. Furthermore, a place of interest A3 is a place where the user gets angry when the autonomous moving body 10 enters the place. In the environment map M3 modified by the attention level map M2, modified places P1 to P3 are indicated as restricted areas for the autonomous moving body 10.

By receiving the environment map and the attention level map as described above, the autonomous moving body 10 becomes able to move more safely even at a place where the autonomous moving body 10 comes for the first time, and moreover, the autonomous moving body 10 becomes able to move according to circumstances of each user.

Figure 18:
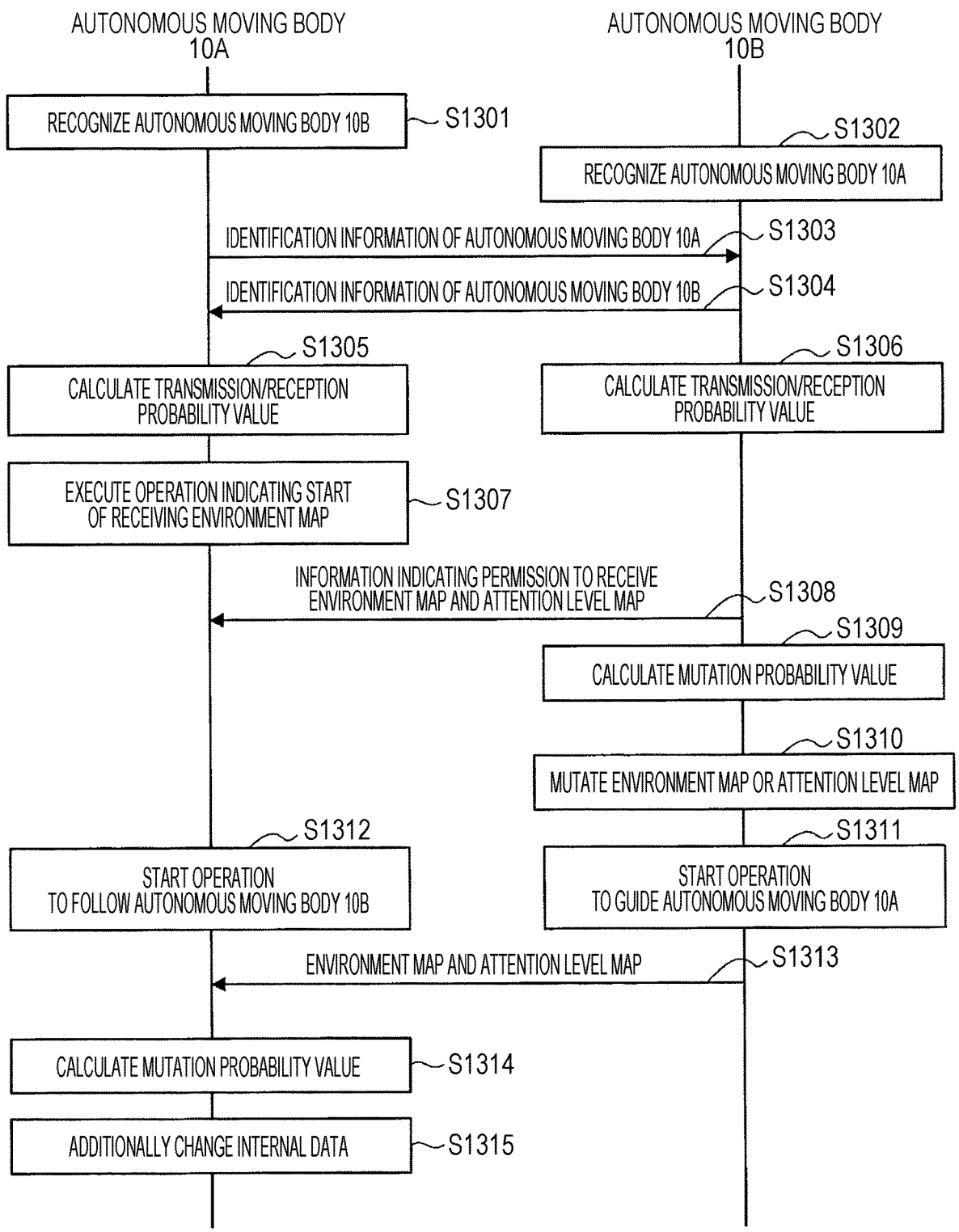
FIG. 18 is a diagram for explaining an example of a flow of operations related to transmission/reception of the environment map and the attention level map by the autonomous moving bodies 10 according to the same embodiment and related to expression of execution of the transmission/reception.

Subsequently, a description will be given of an example of a flow of operations related to the transmission/reception of the environment map and the attention level map by the autonomous moving bodies 10 and related to the expression of the execution of the transmission/reception. FIG. 18 is a diagram for explaining the example of the flow of the operations related to the transmission/reception of the environment map and the attention level map by the autonomous moving bodies 10 according to the present embodiment and the expression of the execution of the transmission/reception.

Referring to FIG. 18, first, the recognition unit 102 of the autonomous moving body 10A recognizes the autonomous moving body 10B (S1301). Moreover, the recognition unit 102 of the autonomous moving body 10B also recognizes the autonomous moving body 10A (S1302). Next, the communication unit 108 of the autonomous moving body 10A transmits the identification information of the autonomous moving body 10A to the autonomous moving body 10B (S1303). On the other hand, the communication unit 108 of the autonomous moving body 10B also transmits the identification information of the autonomous moving body 10B to the autonomous moving body 10A (S1304).

Next, the data transmission/reception unit 105 of the autonomous moving body 10A calculates the transmission/ reception probability value on the basis of the parameters of the autonomous moving body 10A and the identification information of the autonomous moving body 10B (S1305). The data transmission/reception unit 105 of the autonomous moving body 10B also calculates the transmission/reception probability value on the basis of the parameters of the autonomous moving body 10B and the identification information of the autonomous moving body 10A (S1306). Next, the motion control unit 107 of the autonomous moving body 10A causes the drive unit 109 and the output unit 110 to execute a motion indicating the start of reception of the environment map to the autonomous moving body 10B (S1307).

Next, the communication unit 108 of the autonomous moving body 10B transmits information indicating a permission to receive the environment map to the autonomous moving body 10A (S1308). Next, the data mutation unit 106 of the autonomous moving body 10B calculates a mutation probability value (S1309). Next, the data mutation unit 106 of the autonomous moving body 10B mutates the environment map or the attention level map on the basis of the mutation probability value calculated in step S1309 (S1310).

Next, the motion control unit 107 of the autonomous moving body 10B causes the drive unit 109 and the output unit 110 to execute an operation of making a guide of a place shown in the environment map (S1311). Moreover, the autonomous moving body 10A causes the drive unit 109 to start a motion of following the autonomous moving body 10B (S1312). Next, the communication unit 108 of the autonomous moving body 10B transmits the environment map and an attention level map corresponding to the environment map to the autonomous moving body 10A (S1313). Next, the data mutation unit 106 of the autonomous moving body 10A calculates a mutation probability value on the basis of the parameters of the autonomous moving body 10A and the identification information of the autonomous moving body 10B (S1314). Here, the autonomous moving body 10A may mutate the environment map and the attention level map on the basis of the mutation probability value calculated in step S1314.

Next, the data transmission/reception unit 105 of the autonomous moving body 10A causes the storage unit 104 to store the class received in step S1213 and the information for executing the motion corresponding to the class, thereby updating the internal data (S1315). Then, the autonomous moving body 10A and the autonomous moving body 10B end the motions.

The transmission/reception of the environment map and the attention level map by the autonomous moving body 10 is expressed by the action as described above, whereby the user becomes able to understand that the autonomous moving body 10 has been provided with the information related to a new place from the other autonomous moving body 10.

Figure 19:
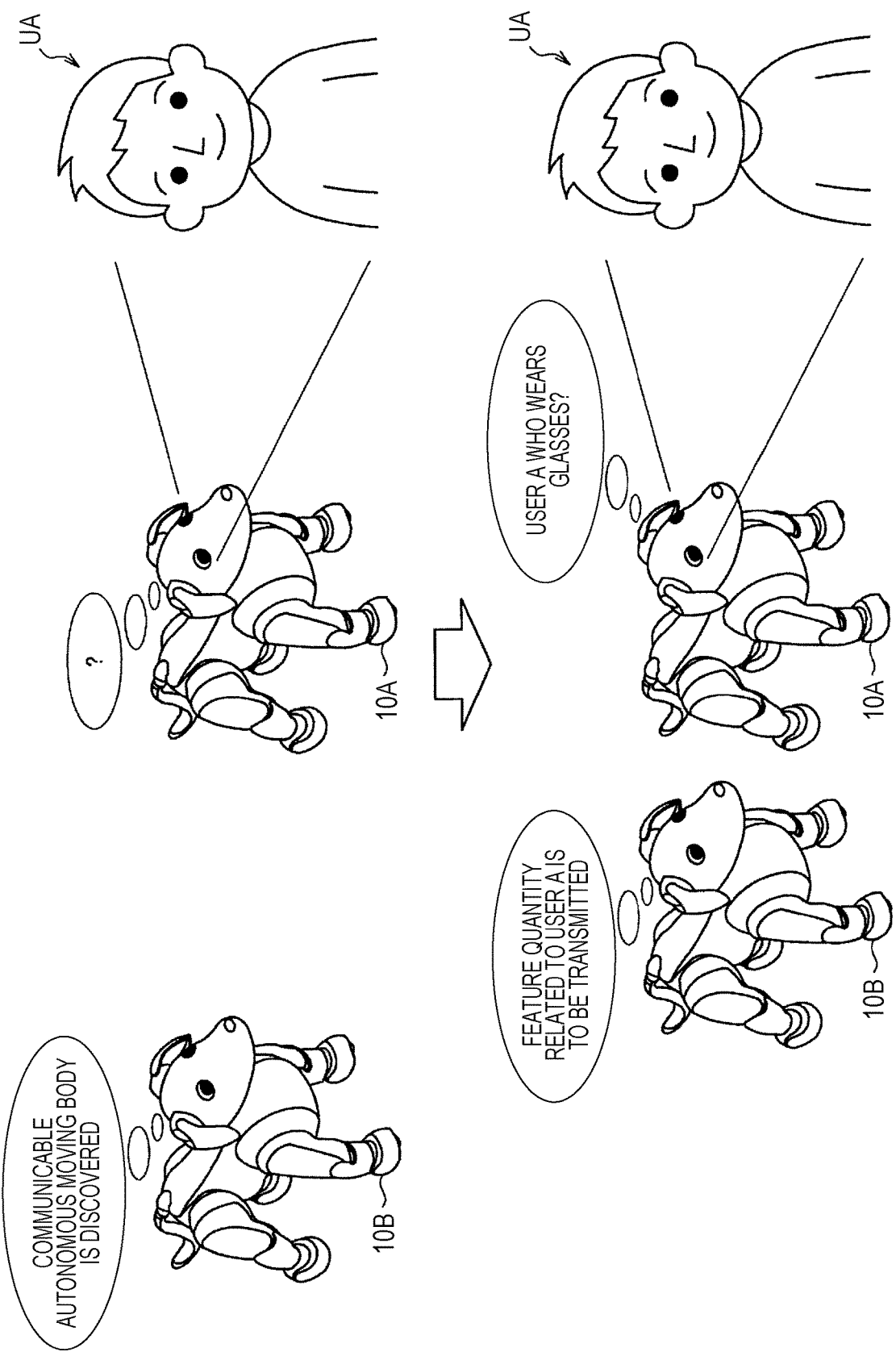
FIG. 19 is a diagram for explaining an example of expressing, by an action, transmission/reception of feature quantities for use in user recognition by the autonomous moving bodies 10 according to the same embodiment.

Incidentally, as an example of the internal data, a feature quantity for user recognition is also mentioned. FIG. 19 is a diagram for explaining an example of expressing, by an action, transmission/reception of the feature quantity for use in the user recognition by the autonomous moving body 10. FIG. 19 shows the autonomous moving body 10A, the autonomous moving body 10B, and a user UA.

The motion control unit 107 of the autonomous moving body 10 causes, by an action, the expression of the execution of the transmission/reception of the feature quantity, the execution being done by the data transmission/reception unit 105 for the user recognition, when transmitting/receiving the feature quantity. Specifically, the motion control unit 107 of the autonomous moving body 10 controls the drive unit 109 and the output unit 110 so that the execution of transmission/reception of information related to the identification of a predetermined user can be understood.

Note that the data mutation unit 106 of the autonomous moving body 10 may mutate the feature quantity of the user. In an example of FIG. 19, the communication unit 108 of the autonomous moving body 10B transmits the feature quantity of the user UA, which is mutated by the data mutation unit 106 of the autonomous moving body 10B, to the autonomous moving body 10A.

In an example on an upper side of FIG. 19, the autonomous moving body 10A is in a state of being incapable of recognizing the user UA, and the autonomous moving body 10B is in a situation of recognizing the autonomous moving body 10A. In an example of a lower side of FIG. 19, the autonomous moving body 10B transmits the feature quantity of the user UA to the autonomous moving body 10A, and the autonomous moving body 10A starts a search for the user UA and discovers the user UA. However, the autonomous moving body 10A searches for the user UA who is "wearing glasses" and does not completely recognize the user UA.

The autonomous moving body 10 receives the feature quantity for use in the user recognition from the other autonomous moving body 10 as described above, and can thereby shorten a learning time required for the user recognition. Moreover, the feature quantity for use in the user recognition is mutated, thus making it possible to achieve an action of gradually memorizing an appearance of the user.

Figure 20:
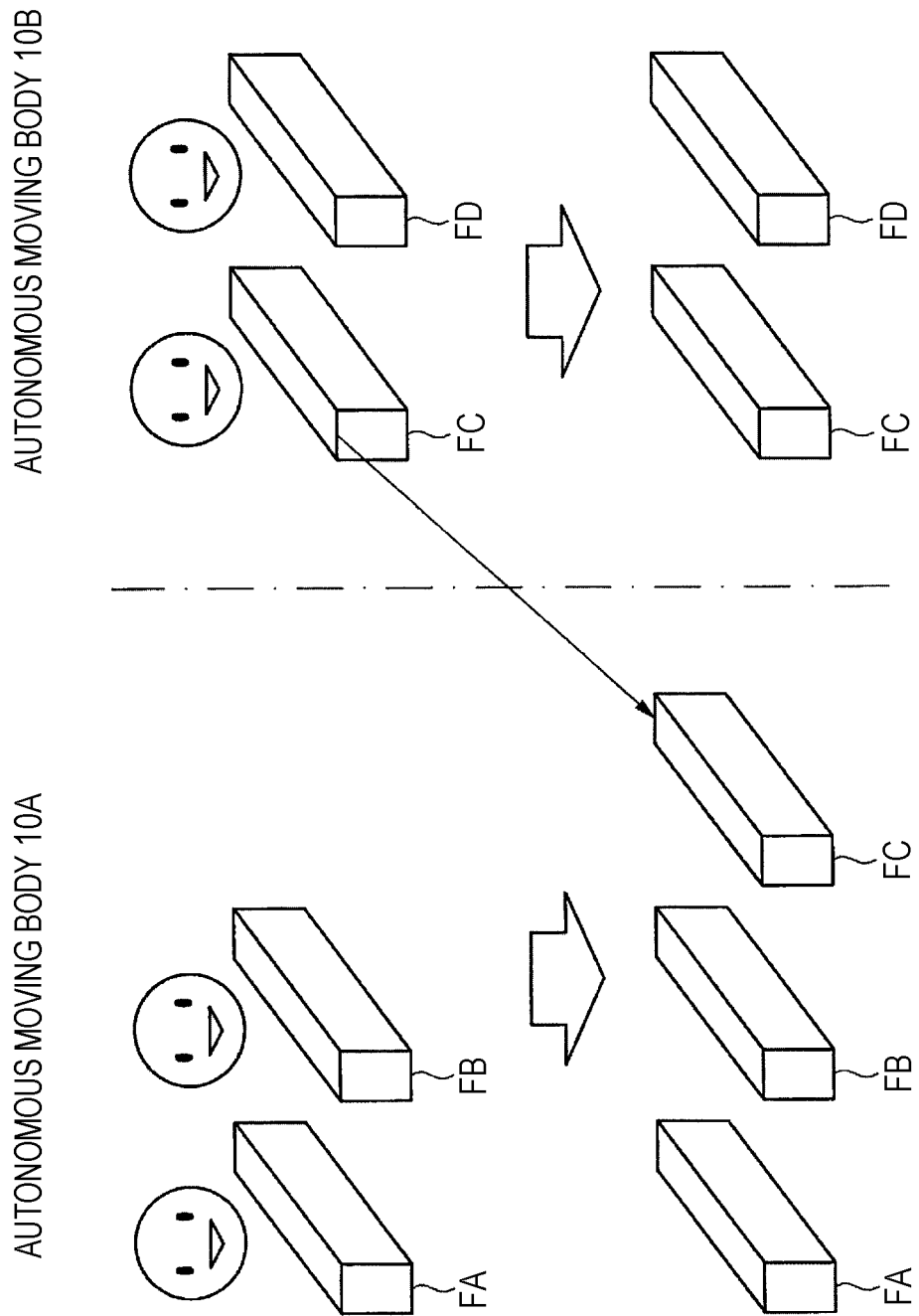
FIG. 20 is a diagram for explaining the feature quantities transmitted/received by the autonomous moving bodies 10 according to the same embodiment.

Subsequently, such feature quantities to be transmitted/received by the autonomous moving bodies 10 will be described. FIG. 20 is a diagram for explaining feature quantities transmitted and received by the autonomous moving bodies 10 according to the present embodiment. FIG. 20 shows feature quantities FA to FD corresponding to the respective users A to D.

Note that each of the autonomous moving bodies 10 receives the feature quantity of the user from the other autonomous moving body 10 having the same feature quantity calculation procedure, and additionally updates corresponding feature quantity data of the user, and thereby becomes able to recognize the user. In an example on an upper side of FIG. 20, the autonomous moving body 10A has the feature quantity FA of the user A and the feature quantity FB of the user B. On the other hand, the autonomous moving body 10B has the feature quantity FC of the user C and the feature quantity FD of the user D.

Here, as shown in an example of a lower side of FIG. 20, when the autonomous moving body 10B transmits the feature quantity FC of the user C to the autonomous moving body 10A, the autonomous moving body 10A becomes able to recognize the user C on the basis of the feature quantity FC of the user C.

Usually, the learning of the user, which uses the feature quantity, needs to use images in which the user is photographed in a variety of situation. However, the feature quantity itself is transmitted/received as described above, thus making it possible to save the trouble of learning the feature of the user one more time.

Incidentally, in the user recognition, even if the user is the same, an appearance thereof may change due to an environment such as illuminance and an orientation of a camera, a situation of the user, in which the user wears makeup or wears glasses, and the like. Hence, clustering of such feature quantities may be performed in order to more accurately recognize the same user in a variety of situations. Note that the data mutation unit 106 may mutate a feature quantity to be mutated in the clustered feature quantities. FIG. 21 is a diagram for explaining the clustering of the feature quantities in the user recognition according to the present embodiment and the mutation of the feature quantities by the data mutation unit 106.

FIG. 21 shows a feature quantity map FM. The feature quantity map FM shows a cluster FAG of the clustered feature quantities of the user A, a cluster FBG of the feature quantities of the user B, and a cluster FCG of the feature quantities of the user C.

Here, the recognition unit 102 may recognize the user depending on which cluster the acquired feature quantity belongs to. In an example on a left side of FIG. 21, the recognition unit 102 may recognize the recognized user as the user A on the basis of the fact that such an acquired feature quantity FA1 belongs to the cluster FAG of the user A.

Note that, on the basis of the feature quantity map FM, the data mutation unit 106 may mutate the feature quantity when transmitting/receiving the feature quantity. An example on a right side of FIG. 21 will be described. In a case where the feature quantity acquired by the recognition unit 102 belongs to the cluster FAG of the feature quantities of the user A, for example, considered is a straight line that connects a center FAO of the cluster FAG of the feature quantity of the user A and a center FBO of the cluster FBG of the feature quantities of the user B to each other. Next, the data mutation unit 106 selects any one point on the straight line, defines a feature quantity FB2, which is closest to the selected point FP, as the recognized feature quantity, and may thereby perform the mutation.

Figure 22:
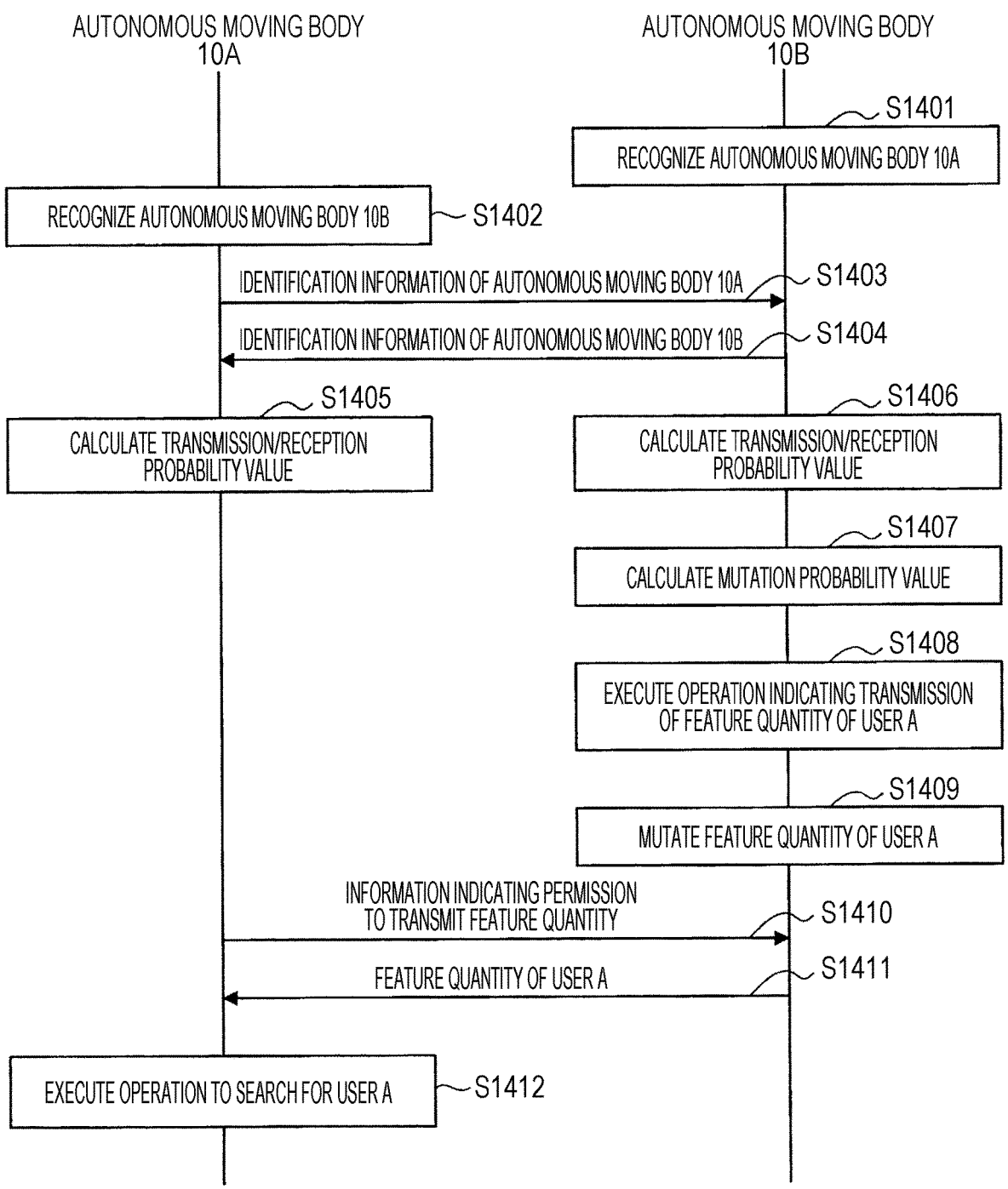
FIG. 22 is a diagram for explaining an example of a flow of operations related to transmission/reception of a user's feature quantity by the autonomous moving bodies 10 according to the same embodiment and related to expression of execution of the transmission/reception.

Subsequently, a description will be given of an example of a flow of operations related to the transmission/reception of the feature quantity of the user by the autonomous moving bodies 10 and related to the expression of the execution of the transmission/reception. FIG. 22 is a diagram for explaining the example of the flow of the operations related to the transmission/reception of the feature quantity of the user by the autonomous moving bodies 10 according to the present embodiment and related to the expression of the execution of the transmission/reception.

Referring to FIG. 22, first, the recognition unit 102 of the autonomous moving body 10B recognizes the autonomous moving body 10A (S1401). Moreover, the recognition unit 102 of the autonomous moving body 10A also recognizes the autonomous moving body 10B (S1402). Next, the communication unit 108 of the autonomous moving body 10A transmits the identification information of the autonomous moving body 10A to the autonomous moving body 10B (S1403). On the other hand, the communication unit 108 of the autonomous moving body 10B also transmits the identification information of the autonomous moving body 10B to the autonomous moving body 10A (S1404).

Next, the data transmission/reception unit 105 of the autonomous moving body 10A calculates a transmission/reception probability value on the basis of the parameters of the autonomous moving body 10A and the identification information of the autonomous moving body 10B (S1405). The data transmission/reception unit 105 of the autonomous moving body 10B also calculates a transmission/reception probability value on the basis of the parameters of the autonomous moving body 10B and the identification information of the autonomous moving body 10A (S1406). Next, the autonomous moving body 10A calculates the mutation probability value on the basis of the parameters of the autonomous moving body 10A and the identification information of the autonomous moving body 10B (S1407). Next, the motion control unit 107 of the autonomous moving body 10B causes the drive unit 109 and the output unit 110 to execute a motion indicating the transmission of the feature quantity of the user A to the autonomous moving body 10A (S1408).

Next, the data mutation unit 106 of the autonomous moving body 10B mutates the feature quantity of the user A on the basis of the mutation probability value (S1409). Next, the communication unit 108 of the autonomous moving body 10A transmits, to the autonomous moving body 10B, information indicating a permission to transmit the feature quantity of the user A (S1410). Next, the communication unit 108 of the autonomous moving body 10B transmits the feature quantity of the user A to the autonomous moving body 10A (S1411).

Next, the motion control unit 107 of the autonomous moving body 10A executes the search for the user A corresponding to the feature quantity of the user A, which is received in step S1411 (S1412), and the autonomous moving body 10A and the autonomous moving body 10B end the motions.

The transmission/reception of the feature quantity of the user by the autonomous moving body 10 is expressed by the action as described above, whereby the user becomes able to understand that the autonomous moving body 10 has been provided with the information related to a new user from the other autonomous moving body 10.

In the above, the example in a case where the internal data is the information related to the recognition processing has been described. However, the internal data may be information for executing the motions of the autonomous moving body 10. FIG. 23 is a diagram for explaining an example of transmission/reception of information for executing motions of the autonomous moving bodies 10 according to the present embodiment and expression of the transmission/reception by the autonomous moving bodies 10.

FIG. 23 shows autonomous moving bodies 10A to 10C. Here, each autonomous moving body 10 can transmit/receive the information for executing the motion to/from the other autonomous moving body 10. Here, the information for executing the motion means, for example, information necessary for the autonomous moving body 10 to execute a variety of motions.

In an example on an upper figure of FIG. 23, the autonomous moving body 10C is executing a predetermined motion. At this time, the autonomous moving bodies 10A and 10B recognize the autonomous moving body 10C that performs the predetermined motion. Here, the autonomous moving body 10C transmits information necessary to execute the predetermined motion to the autonomous moving bodies 10A and 10B.

In an example of a lower figure of FIG. 23, on the basis of the information received from the autonomous moving body 10C, the autonomous moving bodies 10A and 10B execute a motion corresponding thereto, thereby express a content of the motion corresponding to the received information.

Note that, when transmitting/receiving the internal data, the data transmission/reception unit 105 calculates the transmission/reception probability value, and the data mutation unit 106 calculates the mutation probability value. The parameters of the autonomous moving body 10 for use at that time may include the character and influence value of the autonomous moving body 10. For example, the mutation probability value may be calculated on the basis of the character of the autonomous moving body 10, and the transmission/reception probability value may be calculated on the basis of the influence value of the autonomous moving body 10.

For example, the data transmission/reception unit 105 of the autonomous moving body 10 may compare the influence value of the autonomous moving body 10 itself with the influence value of the other autonomous moving body 10, and may determine whether or not to transmit/receive the internal data. Moreover, for example, the data mutation unit 106 of the autonomous moving body 10 may mutate the internal data on the basis of the character of the autonomous moving body 10 itself.

An example of FIG. 23 will be described. On the basis of the fact that the influence value of the autonomous moving body 10C is higher than the influence values of the autonomous moving bodies 10A and 10B, the data transmission/reception unit 105 of the autonomous moving body 10C determines to transmit the information for executing the motion.

Moreover, on the basis of the fact that the character of the autonomous moving body 10B is "impatient", the data mutation unit 106 of the autonomous moving body 10B may mutate the information for executing the operation received from the autonomous moving body 10C. In the example of the lower figure of FIG. 23, the autonomous moving body 10B is executing a motion partially different from the autonomous moving body 10C.

As described above, when transmitting/receiving the information for executing the motion of the autonomous moving body 10, the character and influence value of the autonomous moving body 10 are used, thus making it possible to more naturally express individuality of each autonomous moving body 10.

Figure 24:
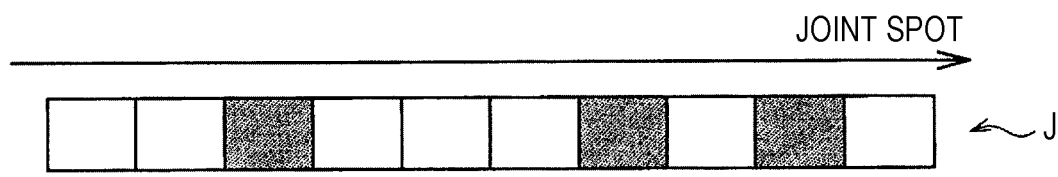
FIG. 24 is a diagram for explaining an example of mutation of the information for executing the motions of the autonomous moving body 10 according to the same embodiment.
Figure 25:
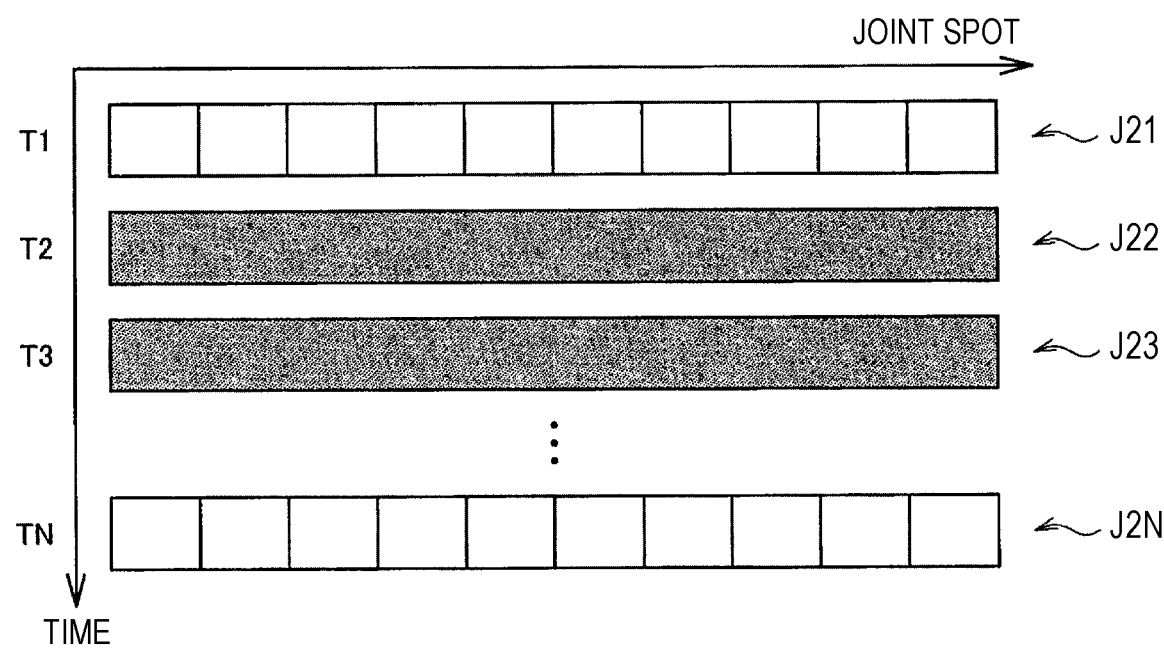
FIG. 25 is a diagram for explaining an example of the mutation of the information for executing the motions of the autonomous moving body 10 according to the same embodiment.
Figure 26:
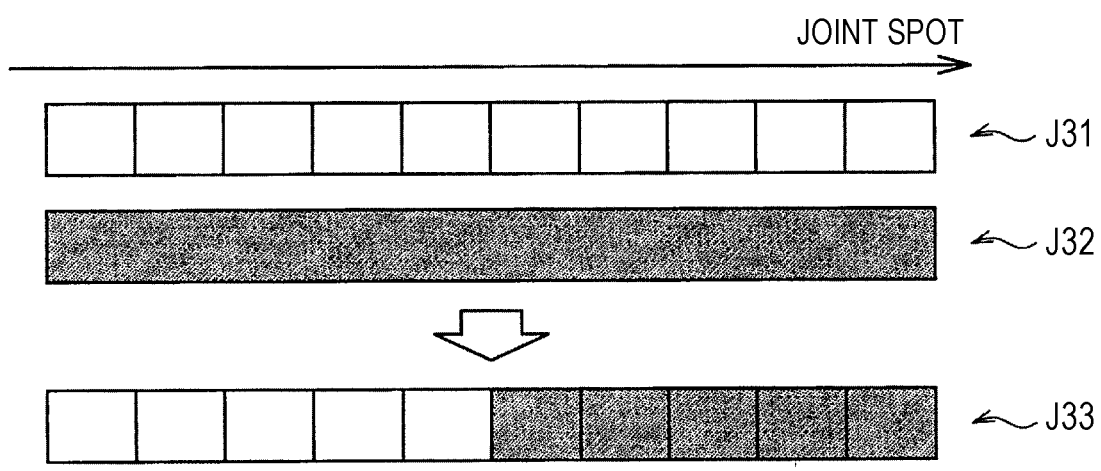
FIG. 26 is a diagram for explaining an example of the mutation of the information for executing the motions of the autonomous moving body 10 according to the same embodiment.

Subsequently, an example of mutation of information for executing indirect control among the motions of the autonomous moving body 10 will be described. FIGS. 24 to 26 are diagrams for explaining the example of the mutation of the information for executing the motion of the autonomous moving body 10 according to the present embodiment.

FIG. 24 shows the presence or absence of mutation in a motion at each joint of the autonomous moving body 10. As shown in FIG. 24, the data mutation unit 106 may determine whether or not to mutate the motion at each joint spot.

FIG. 25 shows the presence or absence of mutations in posture information J21 to J2N at the respective joint spots of the autonomous moving body 10 and in time series T1 to TN. The data mutation unit 106 may mutate a motion at a specific time. In an example of FIG. 25, the data mutation unit 106 mutates the posture information J22 and J23 of the autonomous moving body 10 at times T2 and T3.

FIG. 26 shows posture information J31 received from the other autonomous moving body 10 and posture information J32 stored by the autonomous moving body 10 itself. The data mutation unit 106 may mutate the posture information J31 using the posture information J32.

In an example of FIG. 26, the data mutation unit 106 mutates the posture information J31 by the posture information J32. In the posture information J33 after the mutation, a posture of a predetermined joint spots is based on the posture information J31, and a posture of the other joint spot is based on the posture information J32.

The posture information is mutated as described above, whereby a variety of motions of the autonomous moving body 10 can be passed to the other autonomous moving body 10. According to such a function, the user becomes able to enjoy motions different for each autonomous moving body 10.

Figure 27:
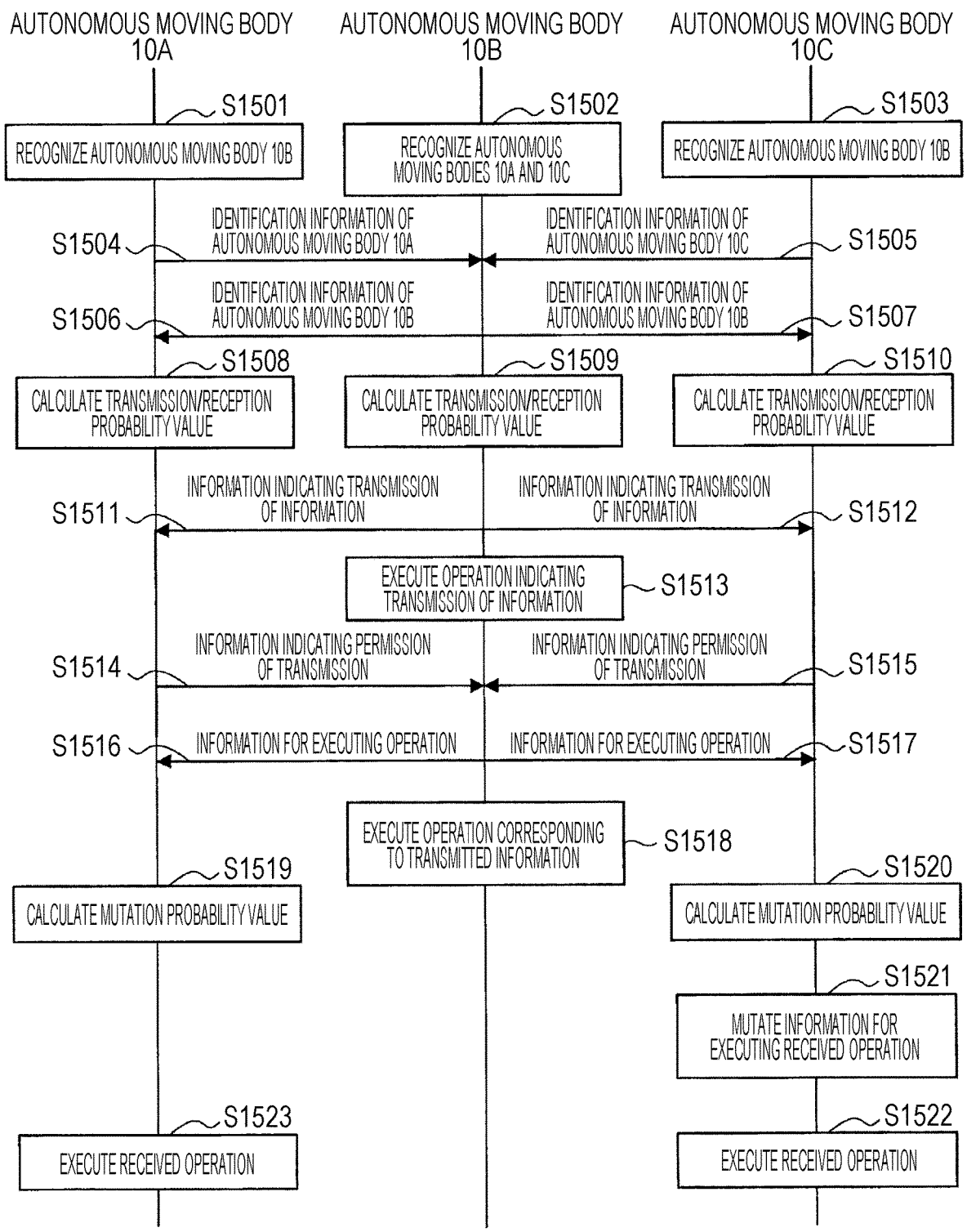
FIG. 27 is a diagram for explaining an example a flow of transmission/reception of information for executing motions of the autonomous moving bodies 10 according to the same embodiment by the autonomous moving bodies 10 and of expressions related to execution of the transmission/reception by the autonomous moving bodies 10.

Subsequently, a description will be given of an example of a flow of the transmission/reception of the information for executing the motions of the autonomous moving bodies 10 by the autonomous moving bodies 10 and of the expression related to the execution of the transmission/reception by the autonomous moving bodies 10. FIG. 27 is a diagram for explaining the example of the flow of the transmission/reception of the information for executing the motions of the autonomous moving bodies 10 according to the present embodiment by the autonomous moving bodies 10 and of the expressions related to the execution of the transmission/reception by the autonomous moving bodies 10.

Referring to FIG. 27, first, the recognition unit 102 of the autonomous moving body 10A recognizes the autonomous moving body 10B (S1501). Moreover, the recognition unit 102 of the autonomous moving body 10B recognizes the autonomous moving bodies 10A and C (S1502). Furthermore, the recognition unit 102 of the autonomous moving body 10C recognizes the autonomous moving body 10B (S1503). Next, the communication unit 108 of the autonomous moving body 10A transmits the identification information of the autonomous moving body 10A to the autonomous moving body 10B (S1504). Moreover, the communication unit 108 of the autonomous moving body 10C also transmits the identification information of the autonomous moving body 10C to the autonomous moving body 10B (S1505). Moreover, the communication unit 108 of the autonomous moving body 10B transmits the identification information of the autonomous moving body 10B to the autonomous moving body 10A (S1506). Likewise, the communication unit 108 of the autonomous moving body 10B transmits the identification information of the autonomous moving body 10B to the autonomous moving body 10C (S1507).

Next, the data transmission/reception unit 105 of the autonomous moving body 10A calculates the transmission/reception probability value on the basis of the parameters of the autonomous moving body 10A and the identification information of the autonomous moving body 10B (S1508). Moreover, the data transmission/reception unit 105 of the autonomous moving body 10B also calculates the transmission/reception probability value on the basis of the parameters of the autonomous moving body 10B and the identification information of the autonomous moving bodies 10A and C (S1509). Furthermore, the data transmission/reception unit 105 of the autonomous moving body 10C also calculates the transmission/reception probability value on the basis of the parameters of the autonomous moving body 10C and the identification information of the autonomous moving body 10B (S1510).

Next, the autonomous moving body 10B transmits the information for executing the motion to the autonomous moving body 10A (S1511). Likewise, the autonomous moving body 10B transmits the information for executing the motion to the autonomous moving body 10C (S1512). Next, the motion control unit 107 of the autonomous moving body 10B causes the drive unit 109 and the output unit 110 to execute an operation indicating the transmission of the information for executing the motion to the autonomous moving bodies 10A and 10C (S1513). Next, the communication unit 108 of the autonomous moving body 10A transmits, to the autonomous moving body 10B, information indicating a permission to transmit the information for executing the motion (S1514). Next, the communication unit 108 of the autonomous moving body 10C transmits, to the autonomous moving body 10B, the information indicating the permission to transmit the information for executing the motion (S1515).

Next, the communication unit 108 of the autonomous moving body 10B transmits the information for executing the motion, which is determined in step S1509, to the autonomous moving body 10A (S1516) Likewise, the communication unit 108 of the autonomous moving body 10B transmits the information to the autonomous moving body 10C (S1517).

Next, the data mutation unit 106 of the autonomous moving body 10B executes an operation corresponding to the information transmitted in steps S1516 and S1517 (S1518). Next, the autonomous moving body 10A calculates the mutation probability value on the basis of the information for executing the motion, which is received in step S1516 (S1519). Likewise, the data mutation unit 106 of the autonomous moving body 10C also calculates the mutation probability value on the basis of the information for executing the motion, which is received in step S1517 (S1520).

Next, on the basis of the mutation probability value calculated in step S1520, the data mutation unit 106 of the autonomous moving body 10C mutates the information received in step S1519 (S1521). Next, the motion control unit 107 of the autonomous moving body 10C causes the execution of the motion on the basis of the information mutated in step S1523 (S1522). Moreover, the motion control unit 107 of the autonomous moving body 10A causes the execution of the motion on the basis of the information received in step S1518 (S1523), and the autonomous moving body 10A and the autonomous moving body 10B end the motions.

The transmission/reception of the information for executing the motion by the autonomous moving body 10 is expressed by the action as described above, whereby the user becomes able to understand that the autonomous moving body 10 has been provided with the motion from the other autonomous moving body 10.

Incidentally, though the autonomous moving body 10 has been described as an apparatus that expresses the execution of the transmission/reception of the internal data, the apparatus that expresses the execution of the transmission/reception of the internal data is not limited to the autonomous moving body 10. For example, a head-mounted display (HMD) may express, to the user, transmission/reception of the internal data to/from another head-mounted display.

FIG. 28 is a diagram for explaining that the head-mounted display expresses the execution of the transmission/reception of the internal data. FIG. 28 shows a user UH1 who wears a head-mounted display H1 and a user UH2 who wears a head-mounted display H2. Note that the internal data mentioned herein means, for example, map information. The map information may include information acquired by the head-mounted display H2, for example, such as traffic congestion information on a road.

In FIG. 28, the head-mounted display H1 and the head-mounted display H2 are made capable of transmitting/receiving the internal data. In an example of FIG. 28, the head-mounted display H1 receives map information HM from the head-mounted display H2, and displays the received map information HM to the user UH1.

Moreover, the head-mounted display may additionally change a recognizable target by transmitting/receiving, for example, information related to recognition, such as a class of the recognition target. The head-mounted display transmits/receives the information to/from the other head-mounted display, thus making it possible to dynamically update the information.

4. Summary

As described above, the autonomous moving body 10 according to the embodiment of the present disclosure is able to express the execution of the transmission/reception of the internal data by the action when transmitting/receiving the internal data. According to such a configuration, the user will be able to recognize the changes of the recognition and motion of the autonomous moving body 10, and moreover, becomes able to enjoy the change in the motion of the autonomous moving body 10 more.

Although the preferred embodiments of the present disclosure have been described above in detail with reference to the accompanying drawings, the technical scope of the present disclosure is not limited to such examples. It is obvious that a person having ordinary knowledge in the technical field of the present disclosure can come up with various changes or modifications within the scope of the technical idea described in the claims, and it is naturally understood that these also belong to the technical scope of the present disclosure.

Moreover, the effects described in the present description are merely explanatory or exemplary and are not restrictive. That is, the techniques according to the present disclosure may exert other effects apparent to those skilled in the art from the description of the present description, in addition to the above-described effects or in place of the above-described effects.

Furthermore, it is also possible to create a program for causing hardware such as a CPU, a ROM, and a RAM, which are built into a computer, to exert equivalent functions to those of the configuration of the autonomous moving body 10, and a computer-readable recording medium that records the program can also be provided.

Furthermore, each step related to the processing of the autonomous moving body 10 in the present description does not necessarily have to be processed in chronological order in the order described in the flowcharts. For example, each step related to the processing of the autonomous moving body 10 may be processed in an order different from the order described in the flowcharts, or may be processed in parallel.

Note that configurations as below also belong to the technical scope of the present disclosure.

(1)

An information processing apparatus including:

a motion control unit that controls a motion of an autonomous moving body, in which, when transmitting/receiving internal data related to the autonomous moving body, the motion control unit causes the autonomous moving body to express execution of the transmission/reception of the internal data by an action.

(2)

The information processing apparatus according to the above-described (1), in which whether or not the transmission/reception of the internal data is to be executed is determined according to a magnitude relationship between a transmission/reception probability value and a predetermined threshold value, and the transmission/reception probability value is calculated on the basis of a parameter related to the autonomous moving body.

(3)

The information processing apparatus according to the above-described (2), in which the parameter related to the autonomous moving body includes an influence value of the autonomous moving body.

(4)

The information processing apparatus according to the above-described (2) or (3), further including a data transmission/reception unit that determines whether or not to execute the transmission/reception of the internal data according to the magnitude relationship between the transmission/reception probability value and the predetermined threshold value, and transmits/receives the internal data in a case of having determined to transmit/receive the internal data.

(5)

The information processing apparatus according to any one of the above-described (1) to (4),
in which the internal data is information related to recognition processing of the autonomous moving body, and
the motion control unit causes the autonomous moving body to express the execution of the transmission/reception of the internal data by an action.

(6)

The information processing apparatus according to the above-described (5),
in which the internal data is a class of a recognition target, and
when transmitting/receiving the class, the motion control unit causes the autonomous moving body to express the transmission/reception of the class by an action.

(7)

The information processing apparatus according to the above-described (6),
in which the internal data further includes information for executing a motion of the autonomous moving body, the motion corresponding to the recognition target, and
when transmitting/receiving the class and the information for executing the motion of the autonomous moving body, the motion corresponding to the recognition target, the motion control unit causes the autonomous moving body to execute a motion corresponding to the class.

(8)

The information processing apparatus according to the above-described (6),
in which the internal data is filter information related to a convolutional neural network, and
when transmitting/receiving the filter information, the motion control unit causes the autonomous moving body to express execution of the transmission/reception of the filter information by an action.

(9)

The information processing apparatus according to the above-described (5),
in which the internal data is an environment map, and
when transmitting/receiving the environment map, the motion control unit causes the autonomous moving body to execute a search that is based on the environment map.

(10)

The information processing apparatus according to the above-described (9),
in which the internal data is an attention level map corresponding to the environment map, and
when transmitting/receiving the environment map and the attention level map, the motion control unit causes the autonomous moving body to execute a search that is based on the environment map and the attention level map.

(11)

The information processing apparatus according to the above-described (5),
in which the internal data is a feature quantity for use in user recognition, and
when transmitting/receiving the feature quantity, the motion control unit causes the autonomous moving body to execute a search for a user corresponding to the feature quantity.

(12)

The information processing apparatus according to any one of the above-described (1) to (4),
in which the internal data is information for executing the motion of the autonomous moving body, and
when transmitting/receiving the information for executing the motion, the motion control unit causes the autonomous moving body to execute the motion corresponding to the information as a target of the transmission/reception.

(13)

The information processing apparatus according to the above-described (12),
in which the information for executing the motion of the autonomous moving body is information related to joint control of the autonomous moving body, and
when transmitting/receiving the information related to the joint control, the motion control unit causes the autonomous moving body to execute the motion corresponding to the information as a target of the transmission/reception.

(14)

The information processing apparatus according to any one of the above-described (1) to (13),
in which the internal data is mutated on the basis of a parameter related to the autonomous moving body.

(15)

The information processing apparatus according to the above-described (14),
in which whether or not the internal data is to be mutated is determined on the basis of a mutation probability value.

(16)

The information processing apparatus according to the above-described (15),
in which the mutation probability value is calculated on the basis of the parameter related to the autonomous moving body.

(17)

The information processing apparatus according to any one of the above-described (14) to (16), further including
a data mutation unit that mutates the internal data on the basis of the parameter related to the autonomous moving body when transmitting/receiving the internal data.

(18)

The information processing apparatus according any one of the above-described (1) to (17),
in which the transmission/reception of the internal data is executed to/from another autonomous moving body.

(19)

An information processing method including:
causing a processor to control a motion of an autonomous moving body; and
causing the processor to, when transmitting/receiving internal data related to the autonomous moving body, cause the autonomous moving body to express execution of the transmission/reception of the internal data by an action.

(20)

A program for causing a computer to function as an information processing apparatus including:
a motion control unit that controls a motion of an autonomous moving body,
in which, when transmitting/receiving internal data related to the autonomous moving body, the motion control unit causes the autonomous moving body to express execution of the transmission/reception of the internal data by an action.

REFERENCE SIGNS LIST

- 10 Autonomous moving body
- 101 Input unit
- 102 Recognition unit
- 103 Learning unit
- 104 Storage unit
- 105 Data transmission/reception unit
- 106 Data mutation unit
- 107 Motion control unit
- 108 Communication unit
- 109 Drive unit
- 110 Output unit
- 20 Network

The invention claimed is:

1. An information processing apparatus comprising:
a motion control unit configured to control a motion of an autonomous moving body; and
a data transmission/reception unit configured to determine whether or not to execute transmission/reception of internal data related to the autonomous moving body,
wherein, when transmitting/receiving the internal data related to the autonomous moving body, the motion control unit causes the autonomous moving body to express execution of the transmission/reception of the internal data by an action,
wherein whether or not the transmission/reception of the internal data is to be executed is determined according to a magnitude relationship between a transmission/reception probability value and a predetermined threshold value, and
wherein the motion control unit and the data transmission/reception unit are each implemented via at least one processor.

2. The information processing apparatus according to claim 1,
wherein the transmission/reception probability value is calculated based on a parameter related to the autonomous moving body.

3. The information processing apparatus according to claim 2,
wherein the parameter related to the autonomous moving body includes an influence value of the autonomous moving body.

4. The information processing apparatus according to claim 2,
wherein the data transmission/reception unit transmits/receives the internal data in a case of having determined to transmit/receive the internal data.

5. The information processing apparatus according to claim 1,
wherein the internal data includes information related to recognition processing of the autonomous moving body.

6. The information processing apparatus according to claim 5,
wherein the internal data further includes a class of a recognition target.

7. The information processing apparatus according to claim 6,
wherein the internal data further includes information for executing a motion of the autonomous moving body, the motion corresponding to the recognition target, and
when transmitting/receiving the class and the information for executing the motion of the autonomous moving body, the motion corresponding to the recognition target, the motion control unit causes the autonomous moving body to execute the motion corresponding to the recognition target.

8. The information processing apparatus according to claim 6,
wherein the internal data further includes filter information related to a convolutional neural network, and
when transmitting/receiving the filter information, the motion control unit causes the autonomous moving body to express execution of the transmission/reception of the filter information by the action.

9. The information processing apparatus according to claim 5,
wherein the internal data further includes an environment map, and
when transmitting/receiving the environment map, the motion control unit causes the autonomous moving body to execute a search that is based on the environment map.

10. The information processing apparatus according to claim 9,
wherein the internal data further includes an attention level map corresponding to the environment map, and
when transmitting/receiving the environment map and the attention level map, the motion control unit causes the autonomous moving body to execute search further based on the attention level map.

11. The information processing apparatus according to claim 5,
wherein the internal data further includes a feature quantity for use in user recognition, and
when transmitting/receiving the feature quantity, the motion control unit causes the autonomous moving body to execute a search for a user corresponding to the feature quantity.

12. The information processing apparatus according to claim 1,
wherein the internal data includes information for executing the motion of the autonomous moving body, and
when transmitting/receiving the information for executing the motion, the motion control unit causes the autonomous moving body to execute the motion corresponding to the information as a target of the transmission/reception.

13. The information processing apparatus according to claim 12,
wherein the information for executing the motion of the autonomous moving body includes information related to joint control of the autonomous moving body, and
when transmitting/receiving the information related to the joint control, the motion control unit causes the autonomous moving body to execute the motion corresponding to the information as the target of the transmission/reception.

14. The information processing apparatus according to claim 1,
wherein the internal data is mutated based on a parameter related to the autonomous moving body.

15. The information processing apparatus according to claim 14,
wherein whether or not the internal data is to be mutated is determined based on a mutation probability value.

16. The information processing apparatus according to claim 15,
wherein the mutation probability value is calculated based on the parameter related to the autonomous moving body.

17. The information processing apparatus according to claim 14, further comprising:
- a data mutation unit configured to mutate the internal data based on the parameter related to the autonomous moving body when transmitting/receiving the internal data,
- wherein the data mutation unit is implemented via at least one processor.

18. The information processing apparatus according to claim 1,
- wherein the transmission/reception of the internal data is executed to/from another autonomous moving body.

19. An information processing method comprising:
- causing a processor to control a motion of an autonomous moving body;
- determining whether or not to execute transmission/reception of internal data related to the autonomous moving body; and
- causing the processor to, when transmitting/receiving the internal data related to the autonomous moving body, cause the autonomous moving body to express execution of the transmission/reception of the internal data by an action,
- wherein whether or not the transmission/reception of the internal data is to be executed is determined according to a magnitude relationship between a transmission/reception probability value and a predetermined threshold value.

20. A non-transitory computer-readable storage medium having embodied thereon a program, which when executed by a computer causes the computer to execute a method, the method comprising:
- controlling a motion of an autonomous moving body; and
- determining whether or not to execute transmission/reception of internal data related to the autonomous moving body,
- wherein, when transmitting/receiving the internal data related to the autonomous moving body, the motion control unit causes the autonomous moving body to express execution of the transmission/reception of the internal data by an action, and
- wherein whether or not the transmission/reception of the internal data is to be executed is determined according to a magnitude relationship between a transmission/reception probability value and a predetermined threshold value.

* * * * *